US011999810B2

(12) United States Patent
Bandiera et al.

(10) Patent No.: US 11,999,810 B2
(45) Date of Patent: Jun. 4, 2024

(54) PROCESS FOR PRODUCING AN AQUEOUS POLYMER DISPERSION

(71) Applicants: BASF SE, Ludwigshafen am Rhein (DE); Universidad del Pais Vasco / Euskal Herriko Unibertsitatea, Leioa (ES)

(72) Inventors: Massimo Bandiera, Trostberg (DE); Roelof Balk, Ludwigshafen am Rhein (DE); Bastiaan Lohmeijer, Ludwigshafen am Rhein (DE); Maria Jesus Barandiaran, Leioa (ES)

(73) Assignees: BASF SE, Ludwigshafen am Rhein (DE); Universidad del Pais Vasco/ Euskal Herriko Unibertsitatea, Leioa (ES)

( * ) Notice: Subject to any disclaimer, the term of this patent is extended or adjusted under 35 U.S.C. 154(b) by 538 days.

(21) Appl. No.: 17/257,969

(22) PCT Filed: Jul. 4, 2019

(86) PCT No.: PCT/EP2019/068005
§ 371 (c)(1),
(2) Date: Jan. 5, 2021

(87) PCT Pub. No.: WO2020/007985
PCT Pub. Date: Jan. 9, 2020

(65) Prior Publication Data
US 2021/0269573 A1 Sep. 2, 2021

(30) Foreign Application Priority Data
Jul. 5, 2018 (EP) .................................... 18182011

(51) Int. Cl.
*C08J 3/07* (2006.01)
*C08F 265/06* (2006.01)
*C09D 151/00* (2006.01)
(52) U.S. Cl.
CPC .............. *C08F 265/06* (2013.01); *C08J 3/07* (2013.01); *C09D 151/003* (2013.01); *C08J 2351/00* (2013.01)
(58) Field of Classification Search
CPC ... C08F 265/06; C08F 2/22; C08J 3/07; C08J 2351/00; C09D 151/003; C08L 51/003
USPC ........................................................ 524/460
See application file for complete search history.

(56) References Cited

U.S. PATENT DOCUMENTS

| 4,008,293 A | 2/1977 | Maska et al. |
| 4,269,749 A | 5/1981 | Marriott et al. |
| 4,931,494 A | 6/1990 | Auchter et al. |
| 4,977,219 A | 12/1990 | Watson, Jr. |
| 5,047,588 A | 9/1991 | Taylor |
| 5,117,059 A | 5/1992 | Tylor |
| 5,300,602 A | 4/1994 | Arita et al. |
| 5,352,400 A | 10/1994 | West |
| 5,401,582 A | 3/1995 | Weyland et al. |

(Continued)

FOREIGN PATENT DOCUMENTS

| DE | 4003422 A1 | 8/1991 |
| DE | 19624299 A1 | 1/1997 |

(Continued)

OTHER PUBLICATIONS

Bon et al., "Use of Methyl 2-(Bromomethyl)acrylate as a Chain-Transfer Agent to Yield Functionalized Macromonomers via Conventional and Living Radical Polymerizations", Macromolecules, vol. 33, 2000, pp. 5819-5824.
International Preliminary Report on Patentability received for PCT Patent Application No. PCT/EP2019/068005, dated Jan. 14, 2021, 7 pages.
International Search Report and Written Opinion received for PCT Patent Application No. PCT/EP2019/068005, dated Aug. 9, 2019, 8 pages.
Li et al., "Emulsion polymerization of styrene using irreversible addition-fragmentation chain transfer agents: effect on the course of the polymerization and molecular weight", Colloid Polym Sci., vol. 290, 2012, pp. 719-729.

(Continued)

*Primary Examiner* — Hannah J Pak
(74) *Attorney, Agent, or Firm* — Faegre Drinker Biddle & Reath LLP

(57) ABSTRACT

The present invention relates to a process for producing an aqueous polymer dispersion of polymerized ethylenically unsaturated monomers, where the process has a first polymerization step as an aqueous radical emulsion polymerization of a first monomer composition M.a and a subsequent further polymerization step as an aqueous radical emulsion polymerization of a second monomer composition M.b,
where the monomers M comprise at least one monomer M0 which is selected from compounds of formula 1, wherein X is Cl, Br or $OS(O)_2R^3$, Y is H, Cl, Br, $OS(O)_2R^4$, $C_1$-$C_{10}$-alkyl, or $C(=O)OR^5$, $R^1$ is H or $C_1$-$C_{10}$-alkyl, $R^2$ is H or $C_1$-$C_{10}$-alkyl, $R^3$ is $C_1$-$C_{10}$-alkyl, $R^4$ is $C_1$-$C_{10}$-alkyl, $R^5$ is $C_1$-$C_{20}$-alkyl.

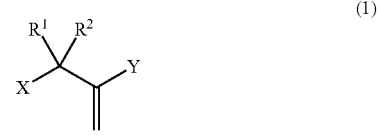

(1)

The invention also relates to an aqueous polymer dispersion obtainable by such a process as well as the use of such dispersions.

23 Claims, No Drawings

(56) References Cited

U.S. PATENT DOCUMENTS

| | | | |
|---|---|---|---|
| 5,498,659 A | 3/1996 | Esser | |
| 5,516,453 A | 5/1996 | Blankenship | |
| 6,096,858 A | 8/2000 | Dobbelaar et al. | |
| 10,597,477 B2 * | 3/2020 | Balk | C09D 151/003 |
| 2002/0064652 A1 | 5/2002 | Lau et al. | |
| 2004/0143058 A1 | 7/2004 | Guo et al. | |
| 2004/0167269 A1 | 8/2004 | Lau et al. | |
| 2006/0247367 A1 | 11/2006 | Guo et al. | |
| 2011/0151128 A1 | 6/2011 | Boggs et al. | |
| 2011/0217471 A1 | 9/2011 | Schwendeman et al. | |
| 2014/0005322 A1 * | 1/2014 | Akkerman | C09D 133/14 524/522 |
| 2015/0011687 A1 * | 1/2015 | Shimanaka | C09D 11/326 524/88 |
| 2015/0307716 A1 | 10/2015 | Jahns et al. | |
| 2017/0275407 A1 | 9/2017 | Balk et al. | |

FOREIGN PATENT DOCUMENTS

| | | | | |
|---|---|---|---|---|
| DE | 19621027 A1 | 11/1997 | | |
| DE | 19741184 A1 | 3/1999 | | |
| DE | 19741187 A1 | 3/1999 | | |
| DE | 19805122 A1 | 4/1999 | | |
| DE | 19828183 A1 | 12/1999 | | |
| DE | 19839199 A1 | 3/2000 | | |
| DE | 19840586 A1 | 3/2000 | | |
| DE | 19847115 C1 | 5/2000 | | |
| EP | 0277361 A1 | 8/1988 | | |
| EP | 0507407 A1 | 10/1992 | | |
| EP | 0628582 A2 | 12/1994 | | |
| EP | 0709441 A2 | 5/1996 | | |
| EP | 0771328 A1 | 5/1997 | | |
| EP | 0789724 A1 | 8/1997 | | |
| EP | 1227116 A1 | 7/2002 | | |
| EP | 2295479 A1 * | 3/2011 | | C08F 220/18 |
| FR | 2280677 A1 | 2/1976 | | |
| WO | 95/04767 A1 | 2/1995 | | |
| WO | 95/29963 A1 | 11/1995 | | |
| WO | 95/33775 A1 | 12/1995 | | |
| WO | 96/14355 A1 | 5/1996 | | |
| WO | 2011/154920 A1 | 12/2011 | | |
| WO | 2012/084973 A1 | 6/2012 | | |
| WO | 2012/140042 A1 | 10/2012 | | |
| WO | 2014/075969 A1 | 5/2014 | | |
| WO | 2015/197662 A1 | 12/2015 | | |
| WO | 2016/042116 A2 | 3/2016 | | |

OTHER PUBLICATIONS

Lohmeijer et al., "Preferred partitioning: the influence of coalescents on the build-up of mechanical properties in acrylic core-shell particles (I)", J. Coat. Technol. Res., vol. 9, No. 4, 2012, pp. 399-409.

Tsavalas et al., "Hydroplasticization of Polymers: Model Predictions and Application to Emulsion Polymers", Langmuir, vol. 26, No. 10, 2010, pp. 6960-6966.

Tsavalas et al., "Measuring the Glass Transition of Latex-Based Polymers in the Hydroplasticized State via Differential Scanning Calorimetry", Langmuir, vol. 26, No. 12, 2010, pp. 9408-9415.

* cited by examiner

PROCESS FOR PRODUCING AN AQUEOUS POLYMER DISPERSION

CROSS-REFERENCE TO RELATED APPLICATIONS

This application is a national stage application (under 35 U.S.C. § 371) of PCT/EP2019/068005, filed Jul. 4, 2019, which claims benefit of European Application No. 18182011.9, filed Jul. 5, 2018, both of which are incorporated herein by reference in their entirety.

The present invention relates to a process for producing an aqueous polymer dispersion of polymerized ethylenically unsaturated monomers, where the process comprises a first polymerization step as an aqueous radical emulsion polymerization of a first monomer composition M.a and a subsequent further polymerization step as an aqueous radical emulsion polymerization of a second monomer composition M.b.

The invention also relates to an aqueous polymer dispersion obtainable by such a process as well as the use of such dispersions.

BACKGROUND OF THE INVENTION

Polymer dispersions are commonly known, in particular as a binder or binder component (also termed co-binder). As a binder, in particular in coatings, one of the important requirements for such coatings is that they possess great hardness and hence, exhibit good scratch resistance and blocking resistance. Furthermore, low film forming temperatures, i.e. filming of the binder in the range of from 0 to 40° C., is highly desirable in order to minimize the required amount of film-forming agent. Another requirement is a high degree of fineness of the particles contained in the dispersions, in order to maximize specific surface area and concomitant binding capacity.

Principally, two stage aqueous polymer dispersions combining a first polymer phase having a comparatively low glass transition temperature and a second polymer phase having a comparatively high glass transition temperature may improve filming properties, because the polymer phase having the low glass transition temperature serves for good filming properties, while the polymer phase having the high glass transition temperatures improves the mechanical properties of the coating, such as blocking resistance, hardness of the polymer film and scratch resistance. However, the properties of these polymer dispersions are often not satisfactory. In particular, it is still challenging to achieve both low filming temperatures and good mechanical properties without the use of volatile organic film forming agents. These polymer dispersions are usually prepared by a so-called two step or two stage aqueous emulsion polymerization, where the two polymer phases are prepared in subsequent emulsion polymerization steps.

An improved process for obtaining improved polymer dispersions having both good mechanical properties and low film forming temperatures includes a two-step emulsion polymerization. In the first polymerization step an acidic low molecular weight polymer is produced which is neutralized by addition of a base before the second polymerization step is performed, where hydrophobic monomers are polymerized in the presence of the neutralized polymer obtained in the first polymerization step. Such processes are described e.g. in WO 95/04767, WO 95/29963 and WO 2012/084973.

WO 2016/042116 describes polymer dispersions which are prepared by a two-step emulsion polymerization, where in a first step a polymer A is prepared by radical polymerization from a $1^{st}$ monomer composition comprising at least one monomer and at least one anionic copolymerizable emulsifier, followed by neutralization of the polymer A with a base, and where in a second step a polymer B is prepared by radical polymerization of a $2^{nd}$ monomer composition comprising at least one monomer and at least one anionic copolymerizable emulsifier, in the presence of the neutralized polymer A.

It is believed that in the above described processes, the polymer of the first polymerization step serves as protective colloid as it is dissolved by the addition of the base after the first polymerization step. Moreover, due to the presence of the carboxylic groups in the polymer of the first stage, it is hydroplasticizable, i.e. it softens under alkaline conditions, which is advantageous for film formation, because hydroplasticization allows for higher glass transition temperatures of the polymers and, as a consequence, for improved mechanical properties without imparting filming properties.

Hydroplasticization has been described, for example, by Lohmeijer et al. in Journal of Coatings Technology and Research 2012, 9(4):399-409 (DOI 10.1007/s11998-012-9396-8) and by Tsavalas et al. in Langmuir 2010, 26(10): 6960-6966 and in Langmuir 2010, 26(12):9408-9415. However, when used as component in paints and/or coatings, in particular as binder or co-binder, the hydrophilicity of the first polymer possibly leads to a detrimental effect. Upon exposure of the coating to water, the polymer may be leached out of the coating, thereby causing a severe loss in the mechanical properties of the coating. Furthermore, leaching of polymers may cause environmental issues which should be avoided.

WO 2012/140042 describes a process for preparing aqueous polymer dispersions comprising a first polymerization step, where an aqueous emulsion of a first monomer mixture comprising a carboxylic acid functional monomer, a surfactant and a water soluble inorganic salt is subjected to an emulsion polymerization in the presence of a chain transfer agent to form a dispersion of a low molecular weight hydroplasticizable first stage polymer, said first stage polymer having a glass transition temperature from 10 to 125° C., and a second polymerization step, where a second monomer mixture is added to the polymer dispersion obtained in the first step, and subjecting the second monomer mixture to an emulsion polymerization to form a second stage polymer in the first particle dispersion to form an aqueous polymer dispersion of multiphase polymer particles, where in the second monomer mixture the carboxylic acid functional monomer is present in an amount such that the acid value of the resulting polymer is less than 23 KOH/g. The leaching properties are still not satisfactory.

Li An et al., Colloid Polymer Science 290:719:729, 2012 describe emulsion polymerizations of styrene in the presence of irreversible additional-fragmentation chain transfer agents, such as 2,3-dichloropropene, ethyl α-p-toluenesulfonyl methacrylate or butyl(2-phenylpropen-3-yl)sulfane.

Stefan Bon et al., Macromolecules 33:5819-5824, 2000 describe the preparation of a polymer latex prepared by emulsion polymerization of methyl methacrylate in the presence of methyl 2-(bromomethyl)acrylate as chain-transfer agent to yield functionalized macromonomers and subsequent polymerization of styrene in the thus obtained polymethylmethacrylate latex.

US 2002/0064652 and US 2004/0167269 describe a process for preparing aqueous polymer dispersions, which comprise an aqueous emulsion polymerization of ethylenically unsaturated monomers in the presence of a macromonomer. The macromonomer must be prepared in a separate step either by solution polymerization in case of acidic monomers or by emulsion polymerization in case of non-polar monomers in the presence of a cobalt chain transfer agent. The method requires additional effort because the macromonomer has to be prepared in a separate step.

The application properties of the polymer dispersions in coatings are not satisfactory.

SUMMARY ON THE INVENTION

It is an object of the present invention to provide aqueous polymer dispersions, which do not have the above mentioned drawbacks of leaching. Furthermore, the polymer dispersions should have low film forming temperatures and provide good coating properties, such as good blocking resistance, high hardness of the polymer film and good scratch resistance. Moreover, it should be possible to prepare the polymer dispersions in a simple manner.

It was surprisingly found that these objectives can be achieved by the process as described herein.

Consequently, a first aspect of the present invention relates to a process for producing aqueous polymer dispersions of polymerized ethylenically unsaturated monomers M, where the monomers M comprise a) at least one monomer M0 which is selected from compounds of formula 1,

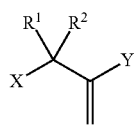

(1)

wherein

X is Cl, Br or $OS(O)_2R^3$, where X is preferably Cl or Br,

Y is H, Cl, Br, $OS(O)_2R^4$, $C_1$-$C_{10}$-alkyl, or $C(=O)OR^5$, where Y is preferably Cl, Br, and $C(=O)OR^5$, $R^1$ is H or $C_1$-$C_{10}$-alkyl, in particular H or $C_1$-$C_4$-alkyl, $R^2$ is H or $C_1$-$C_{10}$-alkyl, in particular H or $C_1$-$C_4$-alkyl, $R^3$ is $C_1$-$C_{10}$-alkyl, in particular $C_1$-$C_4$-alkyl, $R^4$ is $C_1$-$C_{10}$-alkyl, in particular $C_1$-$C_4$-alkyl, and $R^5$ is $C_1$-$C_{20}$-alkyl in particular $C_1$-$C_{10}$-alkyl;

b) at least one monomer M1 which is selected from nonionic monoethylenically unsaturated monomer having a solubility in deionized water of at most 60 g/L at 25° C. and 1 bar, and being different from monomers M0, c) at least one monomer M2 which is selected from ethylenically unsaturated monomers having a carboxylic acid group, d) optionally one or more ethylenically unsaturated monomers M3 that are different from monomers M0, M1, and M2, where the process comprises i) a first polymerization step as an aqueous radical emulsion polymerization of a first monomer composition M.a, which comprises at least 0.1% by weight, based on the total weight of the monomer composition M.a, of at least one monomer M0, at least 1% by weight, based on the total weight of the monomer composition M.a, of at least one monomer M2, ii) neutralizing at least 50% of the carboxylic groups derived from monomers M2 of the polymer of step i) by addition of a base, and subsequently iii) at least one further polymerization step as an aqueous radical emulsion polymerization of a second monomer composition M.b in the presence of the polymer of step ii).

The aqueous polymer dispersions obtained by this process are new and have beneficial properties when used as binders in water-borne coating compositions.

Therefore, the present invention also relates to aqueous polymer dispersions, which are obtainable by the process as described herein.

At least a portion of the polymer obtained in step i) and/or step ii) is covalently bound to the polymer obtained in step iii). The extent of grafting largely depends on the amount of monomer M0 used in the first polymerization step. Due to the covalent binding, the protective colloid is therefore hindered to be washed out. Likewise, the polymer obtained from step iii) cannot be dissolved from the polymer of step i).

The aqueous polymer dispersions obtainable by the process of the present invention exhibit superior properties. In particular, they have low filming temperatures and provide favorable mechanical properties, such as blocking resistance, hardness of the polymer film and scratch resistance, when used as a binder in coating compositions, in particular in waterborne coatings. At the same time, coatings obtained therefrom do show reduced leaching behavior when getting in contact with water, especially with water having an alkaline pH value, such as aqueous alkali or aqueous ammonia. Therefore, they are particularly useful as binders in aqueous coating compositions.

DETAILED DESCRIPTION OF INVENTION

Here and throughout the specification, the prefixes $C_n$-$C_m$ used in connection with compounds or molecular moieties each indicate a range for the number of possible carbon atoms that a molecular moiety or a compound can have. The term "$C_1$-$C_n$ alkyl" denominates a group of linear or branched saturated hydrocarbon radicals having from 1 to n carbon atoms. For example, the term $C_1$-$C_{20}$ alkyl denominates a group of linear or branched saturated hydrocarbon radicals having from 1 to 20 carbon atoms, while the term $C_1$-$C_4$ alkyl denominates a group of linear or branched saturated hydrocarbon radicals having from 1 to 4 carbon atoms. Examples of alkyl include but are not limited to methyl, ethyl, n-propyl, isopropyl, n-butyl, 2-butyl, 2-methylpropyl (isopropyl), 1,1-dimethylethyl (tert-butyl), pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, heptyl, octyl, 2-ethylhexyl, nonyl, decyl, undecyl, dodecyl, tridecyl, tetradecyl, pentadecyl, hexadecyl, heptadecyl, octadecyl, nonadecyl, eicosyl, heneicosyl, docosyl and their isomers. Examples of $C_1$-$C_4$-alkyl are for example methyl, ethyl, propyl, 1-methylethyl, butyl, 1-methylpropyl, 2-methylpropyl or 1,1-dimethylethyl.

The term "polymerization conditions" is generally understood to mean those temperatures and pressures under which the free-radically initiated aqueous emulsion polymerization proceeds at sufficient polymerization rate. They depend particularly on the free-radical initiator used. Advantageously, the type and amount of the free-radical initiator, polymerization temperature and polymerization pressure are selected such that a sufficient amount of initiating radicals is always present to initiate or to maintain the polymerization reaction.

Here and throughout the specification, the term "pphm" (parts per hundred monomers) is used as a synonym for the relative amount of a certain monomer to the total amount of monomer in % by weight. For example, x pphm monomer M2 means x % by weight of monomers M2, based on the total amount of monomers M. In the context of a stage or a step, respectively, the value pphm may refer to the relative amount or level of a specific monomer with regard to the total amount of the monomers polymerized at said stage or step. For example, x pphm monomer M2 in a stage A means that the relative amount or level of said monomer M2 in said stage A is x % by weight, based on the total amount of monomers polymerized in said stage A.

Here and throughout the specification, the term "(meth) acryl" includes both acryl and methacryl groups. Hence, the term "(meth)acrylate" includes acrylate and methacrylate and the term "(meth)acrylamide" includes acrylamide and methacrylamide.

Here and throughout the specification, the term "decorative coating composition" is understood to mean a coating composition for decorative purposes of a surface, such as a paint or a clear coating composition. A paint in contrast to a clear coat contains at least one particulate material selected from pigments and fillers.

The term "water-borne" in the context of a composition means a liquid aqueous composition containing water as the continuous phase in an amount sufficient to achieve flowability.

The terms "wt.-%" and "% by weight" are used synonymously.

If not stated otherwise, the size of the polymer particles as well as the distribution of particle size of the polymer particles in the aqueous polymer dispersion is determined by quasielastic light scattering (QELS), also known as dynamic light scattering (DLS). The measurement method is described in the ISO 13321:1996 standard. The determination can be carried out using a High-Performance Particle Sizer (HPPS). For this purpose, a sample of the aqueous polymer latex will be diluted, and the dilution will be analyzed. In the context of DLS, the aqueous dilution may have a polymer concentration in the range from 0.001 to 0.5% by weight, depending on the particle size. For most purposes, a proper concentration will be 0.01% by weight. However, higher or lower concentrations may be used to achieve an optimum signal/noise ratio. The dilution can be achieved by addition of the polymer latex to water or an aqueous solution of a surfactant in order to avoid flocculation. Usually, dilution is performed by using a 0.1% by weight aqueous solution of a non-ionic emulsifier, e.g. an ethoxylated C16/C18 alkanol (degree of ethoxylation of 18), as a diluent. Measurement configuration: HPPS from Malvern, automated, with continuous-flow cuvette and Gilson autosampler. Parameters: measurement temperature 20.0° C.; measurement time 120 seconds (6 cycles each of 20 s); scattering angle 173°; wavelength laser 633 nm (HeNe); refractive index of medium 1.332 (aqueous); viscosity 0.9546 mPa-s. The measurement yields an average value of the second order cumulant analysis (mean of fits), i.e. Z average. The "mean of fits" is an average, intensity-weighted hydrodynamic particle diameter in nm.

If not stated otherwise, the glass transition temperatures as referred to herein are theoretical glass temperatures as calculated from the monomers used for producing the corresponding polymer phases, respectively. However, it is also possible to determine the actual glass transition temperatures of the polymer phases of the polymer particles by using known methods for measuring the glass transition temperatures, such as differential scanning calorimetry (DSC) or mechanical methods. Usually, the theoretical glass transition temperatures and the actual glass transition temperatures are similar and do not deviate from each other by more than 5 K.

The theoretical glass transition temperatures are usually calculated from the monomer composition by the Fox equation:

$$1/Tg = x_1/Tg_1 + x_2/Tg_2 + \ldots x_n/Tg_n$$

In this equation $x_1, x_2, \ldots x_n$ are the mass fractions of the monomers $1, 2, \ldots n$ and $Tg_1, Tg_2, \ldots Tg_n$ are the glass transition temperatures in Kelvin of the homopolymers synthesized from only one of the monomers $1, 2, \ldots n$ at a time. The Fox equation is described by T. G. Fox in Bull. Am. Phys. Soc. 1956, 1, page 123 and as well as in Ullmann's Encyclopädie der technischen Chemie [Ullmann's Encyclopedia of Industrial Chemistry], vol. 19, p. 18, 4th ed., Verlag Chemie, Weinheim, 1980. The Tg values for the homopolymers of most monomers are known and listed, for example, in Ullmann's Encyclopädie der technischen Chemie [Ullmann's Encyclopedia of Industrial Chemistry], 5th ed., vol. A21, p. 169, Verlag Chemie, Weinheim, 1992. Further sources of glass transition temperatures of homopolymers are, for example, J. Brandrup, E. H. Immergut, Polymer Handbook, 1st Ed., J. Wiley, New York 1966, 2nd Ed. J. Wiley, New York 1975, and 3rd Ed. J. Wiley, New York 1989.

The (theoretical) glass transition temperature of the polymer phases, e.g. phase A, can by adjusted by choosing proper monomers $M_1, M_2 \ldots Mn$ and their mass fractions $x_1, x_2, \ldots x_n$ in the monomer composition so to arrive at the desired glass transition temperature Tg, e.g. Tg(A), respectively. It is common knowledge for a skilled person to choose the proper amounts of monomers $M_1, M_2 \ldots Mn$ for obtaining a copolymer and/or copolymer phase with the desired glass transition temperature.

The actual glass transition temperatures are usually determined experimentally by the differential scanning calorimetry (DSC) method according to ISO 11357-2:2013, preferably with sample preparation according to ISO 16805:2003. Usually, the theoretical glass temperature calculated according to Fox as described herein and the experimentally determined glass transition temperature as described herein are similar or even same and do not deviate from each other by more than 5 K, in particular they deviate not more than 2 K.

The monomers M0 are in particular selected from compounds of formula 1 as described above, where X, Y, $R^1$ and $R^2$, either alone or preferably in combination, have one of the following meanings:
X is Cl or Br, especially Br;
Y is selected from the group consisting of Cl, Br, and $C(=O)OR^5$, where $R^5$ is as defined above and in particular $C_1$-$C_{10}$-alkyl, preferably $C_1$-$C_4$-alkyl and especially methyl, ethyl, n-propyl or n-butyl;

$R^1$ and $R^2$ are, independently from each other, H or $C_1$-$C_4$-alkyl. In particular, $R^1$ is H and $R^2$ is H or $C_1$-$C_4$-alkyl, with preference given to H or $CH_3$ or $C_2H_5$. Especially, both $R^2$ and $R^3$ are H.

In the context of formula 1, i.e. in the context of $OS(O)_2R^3$ and $OS(O)_2R^4$, $R^3$ and $R^4$ are, independently from each other, preferably $C_1$-$C_4$-alkyl, especially methyl or ethyl.

In the context of formula 1, i.e. in the context of $C(=O)OR^5$, $R^5$ is in particular $C_1$-$C_{10}$-alkyl, preferably $C_1$-$C_4$-alkyl and especially methyl, ethyl, n-propyl or n-butyl.

In a first preferred group of embodiments, monomers M0 are selected from compounds of formula 1, where Y is Br. In this particular group of embodiments X, $R^1$ and $R^2$, either alone or preferably in combination have preferably one of the following meanings:

X is Cl or Br, especially Br;
$R^1$ and $R^2$ are, independently from each other, H or $C_1$-$C_4$-alkyl. In particular, $R^1$ is H and $R^2$ is H or $C_1$-$C_4$-alkyl, with preference given to H or $CH_3$ or $C_2H_5$. Especially, both $R^2$ and $R^3$ are H.

In a second particularly preferred group of embodiments, monomers M0 are selected from compounds of formula 1, where Y is $C(=O)OR^5$. These compounds can be described by the following formula 1a, where X

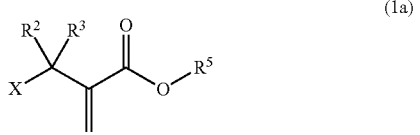

(1a)

In this particular group of embodiments X, $R^1$, $R^2$ and $R^5$, either alone or preferably in combination, have one of the following meanings:

X is Cl, Br or $OS(O)_2R^3$, where $R^3$ is in particular $C_1$-$C_4$-alkyl, and where X is especially Br;
$R^1$ and $R^2$ are, independently from each other, H or $C_1$-$C_4$-alkyl. In particular, $R^1$ is H and $R^2$ is H or $C_1$-$C_4$-alkyl, with preference given to H or $CH_3$ or $C_2H_5$. Especially, both $R^2$ and $R^3$ are H;
$R^5$ is in particular $C_1$-$C_{10}$-alkyl, preferably $C_1$-$C_4$-alkyl and especially methyl, ethyl, n-propyl or n-butyl, i.e. Y is $C(=O)O$—$CH_3$, $C(=O)O$—$C_2H_5$, $C(=O)O$—$C_3H_7$, or $C(=O)O$—$C_4H_9$.

Particular preferred compounds of formula 1 are the compounds of formulae 1b and 1c,

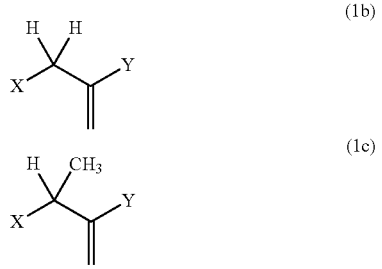

where X and Y are as defined herein.

In a further preferred group of embodiments, monomers M0 are selected from compounds of formulae 1b and 1c, where Y is Br. In this particular group of embodiments X is preferably Cl or Br, especially Br.

In yet a further particularly preferred group of embodiments, monomers M0 are selected from compounds of formulae 1b and 1c, where Y is $C(=O)OR^5$. In this particular group of embodiments X and $R^5$, either alone or preferably in combination, have one of the following meanings:

X is Cl, Br or $OS(O)_2R^3$, where $R^3$ is as defined above and in particular $C_1$-$C_4$-alkyl, and where X is in particular Cl or Br and especially Br;
$R^5$ is in particular $C_1$-$C_{10}$-alkyl, preferably $C_1$-$C_4$-alkyl and especially methyl, ethyl, n-propyl or n-butyl, i.e. Y is $C(=O)O$—$CH_3$, $C(=O)O$—$C_2H_5$, $C(=O)O$—$C_3H_7$, or $C(=O)O$—$C_4H_9$.

Preferred examples of monomers M0 are those of formulae 1a and 1b, where
Y is Br and X is Br, or
Y is Br and X is Cl, or
Y is $C(=O)O$—$CH_3$ and X is Br, or
Y is $C(=O)O$—$C_2H_5$ and X is Br, or
Y is $C(=O)O$—$C_2H_5$ and X is $OS(O)_2R^3$ where $R^3$ is $C_1$-$C_4$-alkyl.

Examples of monomers M1 include, but are not limited to $C_1$-$C_{20}$-alkyl esters and $C_5$-$C_{20}$-cycloalkyl esters of monoethylenically unsaturated monocarboxylic acids having 3 to 6 carbon atoms, such as
  $C_1$-$C_{20}$-alkyl esters of acrylic acid, such as methyl acrylate, ethyl acrylate, n-propyl acrylate, isopropylacrylate, n-butyl acrylate, 2-butyl acrylate, isobutyl acrylate, tert-butyl acrylate, n-pentyl acrylate, n-hexyl acrylate, n-octyl acrylate, 2-ethylhexyl acrylate, n-decyl acrylate, 2-propylheptyl acrylate, lauryl acrylate, $C_{12}/C_{14}$-alkyl acrylate, and stearyl acrylate,
  $C_5$-$C_{20}$-cycloalkyl esters of acrylic acid, such as cyclohexylacrylate, norbornylacrylate and isobornylacrylate.
  $C_1$-$C_{20}$-alkylesters of methacrylic acid, such as methyl methacrylate, ethyl methacrylate, n-propyl methacrylate, isopropyl methacrylate, n-butyl methacrylate, 2-butyl methacrylate, isobutyl methacrylate, tert.-butyl methacrylate, n-pentyl methacrylate, n-hexyl methacrylate, n-octyl methacrylate, 2-ethylhexyl methacrylate, n-decyl methacrylate, 2-propylheptyl methacrylate, lauryl methacrylate, $C_{12}/C_{14}$-alkyl methacrylate, and stearyl methacrylate,
  $C_5$-$C_{20}$-cycloalkyl esters of methacrylic acid, such as cyclohexyl methacrylate, norbornyl methacrylate and isobornyl methacrylate,
  di-$C_1$-$C_{20}$-alkyl esters of monoethylenically unsaturated dicarboxylic acids having 4 to 6 carbon atoms, such as di-$C_1$-$C_{20}$-alkyl esters of itaconic acid, di-$C_1$-$C_{20}$-alkyl esters of citraconic acid, di-$C_1$-$C_{20}$-alkyl esters of maleic acid and di-$C_1$-$C_{20}$-alkyl esters of fumaric acid,
  vinylesters of $C_1$-$C_{20}$-alkanoic acids,
  vinyl aromatic monomers, also termed monovinyl aromatic monomers, such as mono-vinyl substituted aromatic hydrocarbons, such as styrene, 2-methylstyrene, 4-methylstyrene, 2-n-butylstyrene, 4-n-butylstyrene, 4-n-decylstyrene and alpha-methylstyrene,
  $C_2$-$C_6$-monoolefines and butadiene.

Preferred monomers M1 are selected from the group consisting of $C_1$-$C_{20}$-alkyl esters of monoethylenically unsaturated monocarboxylic acids having 3 to 6 carbon atoms, $C_5$-$C_{20}$-cycloalkyl esters of monoethylenically unsaturated monocarboxylic acids having 3 to 6 carbon atoms, and vinyl aromatic compounds. Even more preferred monomers M1 are selected from the group consisting of $C_1$-$C_{20}$-alkyl esters of monoethylenically unsaturated monocarboxylic acids having 3 to 6 carbon atoms and monovinyl aromatic compounds.

In particular, the monomers M1 are selected from the group consisting of C1-$C_{20}$-alkyl esters of acrylic acid, $C_5$-$C_{20}$-cycloalkyl esters of acrylic acid, $C_1$-$C_{20}$-alkylesters of methacrylic acid, $C_5$-$C_{20}$-cycloalkyl esters of methacrylic acid, and monovinyl aromatic monomers. More particularly, the monomers M1 are selected from the group consisting of $C_1$-$C_{20}$-alkyl esters of acrylic acid, $C_1$-$C_{20}$-alkylesters of methacrylic acid, and monovinyl aromatic monomers.

Suitable $C_1$-$C_{20}$-alkyl esters of acrylic acid include but are not limited to methyl acrylate, ethyl acrylate, n-propyl acrylate, isopropyl-acrylate, n-butyl acrylate, sec-butyl acrylate, isobutyl acrylate, tert-butylacrylate, n-pentyl acrylate, n-hexyl acrylate, n-octyl acrylate, 2-ethylhexyl acrylate, n-decyl acrylate, 2-propylheptyl acrylate, lauryl acrylate, $C_{12}$/$C_{14}$-alkyl acrylate, and stearyl acrylate.

Suitable $C_1$-$C_{20}$-alkyl esters of methacrylic acid include but are not limited to
- $C_1$-$C_4$-alkyl esters of methacrylic acid, such as methyl methacrylate, ethyl methacrylate, n-propyl methacrylate, isopropyl methacrylate, n-butyl methacrylate, sec-butyl methacrylate, isobutyl methacrylate and tert-butyl methacrylate; and
- $C_5$-$C_{20}$-alkylesters of methacrylic acid, such as n-pentyl methacrylate, n-hexyl methacrylate, n-octyl methacrylate, 2-ethylhexyl methacrylate, n-decyl methacrylate, 2-propylheptyl methacrylate, lauryl methacrylate, $C_{12}$/$C_{14}$-alkyl methacrylate, and stearyl methacrylate;

and mixtures thereof.

Suitable vinyl aromatic monomers include but are not limited to mono-vinyl substituted aromatic hydrocarbons, such as styrene, 2-methylstyrene, 4-methylstyrene, 2-n-butylstyrene, 4-n-butylstyrene, 4-n-decylstyrene and α-methylstyrene, with particular preference given to styrene.

In particular, the monomers M1 are selected from the group consisting of
- $C_1$-$C_{10}$-alkyl esters of acrylic acid, in particular ethyl acrylate, n-butyl acrylate, sec-butyl acrylate, isobutyl acrylate, tert-butyl acrylate, n-hexyl acrylate, n-octyl acrylate, 2-ethylhexyl acrylate, 2-propylheptyl acrylate and mixtures thereof, such as mixtures of n-butyl acrylate and 2-ethylhexylacrylate or mixtures of n-butyl acrylate and ethyl acrylate or mixtures of ethyl acrylate, n-butyl acrylate, tert-butyl acrylate and 2-ethylhexyl acrylate;
- $C_1$-$C_4$-alkyl esters of methacrylic acid, such as methyl methacrylate, ethyl methacrylate, n-butyl methacrylate, tert-butyl methacrylate, in particular methyl methacrylate;
- vinyl aromatic monomers, in particular mono-vinyl substituted aromatic hydrocarbons, especially styrene.

The monomers M2 are selected from monoethylenically unsaturated monomers having at least one carboxyl group of the formula —COOH, also termed carboxylic acid group, i.e. the monomers M2 bear one ethylenic double bound, in particular a vinylidene group ($H_2C=C<$) or a vinyl group ($H_2C=CH-$), and at least one carboxyl group, e.g. 1 or 2 carboxyl group, in particular one carboxyl group. Preferably, the monomers M2 are selected from the group consisting of monoethylenically unsaturated monocarboxylic acids having 3 to 6 carbon atoms and monoethylenically unsaturated dicarboxylic acids having 4 to 6 carbon atoms.

Preferred monomers M2 include, but are not limited to
- monoethylenically unsaturated monocarboxylic acids having 3 to 6 carbon atoms, such as acrylic acid, methacrylic acid, crotonic acid, 2-ethylpropenoic acid, 2-propylpropenoic acid, 2-acryloxyacetic acid and 2-methacryloxyacetic acid;
- monoethylenically unsaturated dicarboxylic acids having 4 to 6 carbon atoms, such as itaconic acid and fumaric acid.

In particular, the monomers M2 are selected from monoethylenically unsaturated monocarboxylic acids having 3 to 6 carbon atoms, in particular from the group consisting of acrylic acid, methacrylic acid and mixtures of acrylic acid and methacrylic acid. In a particular group of embodiments, the monomer M2 comprises methacrylic acid. Especially, the monomer M2 is methacrylic acid or a mixture of acrylic acid and methacrylic acid.

The monomers M3, that are different from monomers M0, M1, and M2, are preferably selected from the group consisting of
- primary amides of monoethylenically unsaturated monocarboxylic acids having 3 to 8 carbon atoms (monomers M3.1), such as acrylamide and methacrylamide;
- N—$C_1$-$C_{10}$ alkyl amides of monoethylenically unsaturated monocarboxylic acids having 3 to 6 carbon atoms (monomers M3.2), such as N—$C_1$-$C_{10}$ alkyl amides of acrylic acid or methacrylic acid, such as N-methyl acrylamide, N-ethyl acrylamide, N-propyl acrylamide, N-isopropyl acrylamide, N-butyl acrylamide, N-methyl methacrylamide, N-ethyl methacrylamide, N-propyl methacrylamide, N-isopropyl methacrylamide and N-butyl methacrylamide;
- monoethylenically unsaturated monomers bearing a urea and/or a keto group (monomers M3.3),
- hydroxyalkyl esters of monoethylenically unsaturated $C_3$-$C_6$ monocarboxylic acids (monomers M3.4),
- monoethylenically unsaturated monomers which bear at least one mono-, di- and/or tri-$C_1$-$C_4$-alkoxysilane group (monomers M3.5),
- multiethylenically unsaturated monomers (monomers M3.6),
- monoethylenically unsaturated monomers having at least one acidic group, selected from $SO_3H$, $PO_3H_2$ or $OPO_3H_2$, or a salt thereof (monomers M3.7),
- monoethylenically unsaturated monomers bearing at least one epoxy group, in particular a glycidyl group (monomers M3.8), and mixtures of the aforementioned monomers M3.1 to M3.8.

The monomers M3.3 include monoethylenically unsaturated monomers bearing a urea group, hereinafter monomers M3.3a, such as 2-(2-oxo-imidazolidin-1-yl)ethyl acrylate, 2-(2-oxo-imidazolidin-1-yl)ethyl methacrylate, which are also termed 2-ureido (meth)acrylate, N-(2-acryloxyethyl)urea, N-(2-methacryloxyethyl)urea, N-(2-(2-oxo-imidazolidin-1-yl)ethyl) acrylamide, N-(2-(2-oxo-imidazolidin-1-yl)ethyl) methacrylamide, 1-allyl-2-oxoimidazolin, N-vinylurea, and monomers, which bear a keto group, hereinafter monomers M3.3b, such as acetoacetoxyethyl acrylate, acetoacetoxypropyl methacrylate, acetoacetoxybutyl methacrylate, 2-(acetoacetoxy)ethyl methacrylate, diacetoneacrylamide (DAAM) and diacetonemethacrylamide.

The monomers M3.4 are preferably selected from the group consisting of hydroxyalkyl esters of acrylic acid and hydroxyalkyl esters of methacrylic acid, also referred to hereinafter as hydroxyalkyl (meth)acrylates, in particular from the group consisting of hydroxy-$C_2$-$C_4$-alkylesters of acrylic acid and hydroxy-$C_2$-$C_4$-alkylesters of methacrylic acid, such as 2-hydroxyethyl acrylate, 3-hydroxypropyl acrylate, 4-hydroxybutyl acrylate, 2-hydroxyethyl methacrylate, 3-hydroxypropyl methacrylate and 4-hydroxybutyl methacrylate.

The monomers M3.5 which bear at least one mono-, di- and/or tri-$C_1$-$C_4$-alkoxysilane group, such as vinyl dimethoxy methylsilane, vinyl trimethoxysilane, vinyl triethoxysilane, methacryloxyethyl trimethoxysilane, methacryloxyethyl triethoxysilane, and mixtures thereof. The amount of said monomers M3.5, if present, will frequently not exceed 1 pphm and in particular be in the range from 0.01 to 1 pphm.

The monomers M3.6 have usually at least 2, e.g. 2, 3 or 4, non-conjugated ethylenically unsaturated double bounds. Examples of suitable monomers M3.6 include:

- diesters of monoethylenically unsaturated $C_3$-$C_6$ monocarboxylic acids with saturated aliphatic or cycloaliphatic diols, in particular diesters of acrylic acid or methacrylic acid, such as the diacrylates and the dimethacrylates of ethylene glycol (1,2-ethanediol), propylene glycol (1,2-propanediol), 1,2-butanediol, 1,3-butanediol, 1,4-butanediol, neopentyl glycol (2,2-dimethyl-1,3-propanediol), 1,6-hexanediol and 1,2-cyclohexanediol;
- monoesters of monoethylenically unsaturated $C_3$-$C_6$ monocarboxylic acids with monoethylenically unsaturated aliphatic or cycloaliphatic monohydroxy compounds, such as the acrylates and the methacrylates of vinyl alcohol (ethenol), allyl alcohol (2-propen-1-ol), 2-cyclohexen-1-ol or norbornenol, such as allyl acrylate and allyl methacrylate; and
- divinyl aromatic compounds, such as 1,3-divinyl benzene, 1,4-divinyl benzene.

The amount of said monomers M3.6, if present, will frequently not exceed 2 pphm and in particular be in the range from 0.01 to 2 pphm.

The monomers M3.7 include, for example, vinylsulfonic acid, allylsulfonic acid, methallylsulfonic acid, 2-acryloxyethanesulfonic acid, 2-acryloxypropane sulfonic acid, 2-acrylamidoethanesulfonic acid, 2-acrylamidopropanesulfonic acid, 2-acrylamido-2-methylpropanesulfonic acid, vinylphosphonic acid, allylphosphonic acid, methallylphosphonic acid, 2-acryloxyethanephosphonic acid, 2-acryloxypropane phosphonic acid, 2-acrylamidoethanephosphonic acid, 2-acrylamidopropane-phosphonic acid, 2-acrylamido-2-methylpropanephosphonic acid, and the salts thereof, in particular the sodium, potassium or ammonium salts thereof.

The monomers M3.8 preferably bear a glycidyl group. Suitable monomers M3.8 are in particular esters of ethylenically unsaturated monocarboxylic acids with glycidol, for example glycidyl acrylate and glycidyl methacrylate, and glycidyl ethers, such as allyl glycidyl ether.

In particular, the monomers M3, if present, are selected from the group consisting of monomers M3.1, M3.3, M3.4, M3.6 and M3.8 and in particular comprise at least one monomer M3.3, in particular a combination of a monomer M3.3a and a monomer M3.3b.

The monomer composition M.a, which is polymerized in the first polymerization step preferably consists of ethylenically unsaturated monomer(s) selected from the monomers M. Preferably, the monomer composition M.a comprises at least 70% by weight, more preferably at least 90% by weight, more preferably at least 99% by weight, based on the total weight of the monomers, of monomers M which are selected from monomers M0, M1, M2, and M3 and mixtures thereof.

According to the invention, the monomer composition M.a comprises

- at least 0.1% by weight, in particular at least 0.2% by weight, more preferably at least 0.5% by weight, especially at least 1% by weight, e.g. from 0.1 to 10% by weight, in particular from 0.2 to 9% by weight, preferably from 0.5 to 9% by weight, especially from 1 to 8% by weight, based on the total weight of monomers in the monomer composition M.a, of at least one monomer M0, and
- at least 1% by weight, in particular at least 2% by weight, more preferably at least 3% by weight, especially at least 5% by weight, e.g. from 1 to 20% by weight, in particular from 2 to 19.8% by weight or from 2 to 19.5% by weight, preferably 3 to 19% by weight, especially 5 to 18% by weight, based on the total weight of monomers in the monomer composition M.a, of at least one monomer M2.

The total amount of monomers M0+M2 will usually be at least 1.1% by weight, in particular at least 2.2% by weight, more preferably at least 3.5% by weight and especially at least 6% by weight, based on the total weight of monomers in the monomer composition M.a. In particular, the total of monomers M0+M2 will usually not exceed 30% by weight, in particular 25% by weight and especially 20% by weight, based on the total weight of monomers in the monomer composition M.a.

Preferably, the monomers M.a additionally comprise at least 70% by weight, in particular at least 75% by weight, especially at least 80% by weight, e.g. from 70 to 98.9% by weight, in particular from 75 to 97.8% by weight, especially from 70 to 96.5% by weight or from 80 to 94% by weight, based on the total weight of monomers in the monomer composition M.a, of at least one monomer M1.

Preferably, the monomer composition M.a comprises a) 0.1 to 10% by weight, in particular from 0.2 to 9% by weight, preferably from 0.5 to 9% by weight, especially from 1 to 8% by weight, based on the total weight of monomer composition M.a, of at least one monomer M0, in particular a monomer of the formulae M1a, M1b or M1c;

b) 70 to 98.9% by weight, in particular from 75 to 97.8% by weight, especially from 70 to 96.5% by weight or from 80 to 94% by weight, based on the total weight of monomers in the monomer composition M.a, of at least one monomer M1, which is in particular selected from the group consisting of

- $C_1$-$C_{10}$-alkyl esters of acrylic acid, in particular ethyl acrylate, n-butyl acrylate, sec-butyl acrylate, isobutyl acrylate, tert-butyl acrylate, n-hexyl acrylate, n-octyl acrylate, 2-ethylhexyl acrylate, 2-propylheptyl acrylate and mixtures thereof, such as mixtures of n-butyl acrylate and 2-ethylhexylacrylate or mixtures of n-butyl acrylate and ethyl acrylate or mixtures of ethyl acrylate, n-butyl acrylate, tert-butyl acrylate and 2-ethylhexyl acrylate;
- $C_1$-$C_4$-alkyl esters of methacrylic acid, such as methyl methacrylate, ethyl methacrylate, n-butyl methacrylate, tert-butyl methacrylate, in particular methyl methacrylate and butyl methacrylate;
- vinyl aromatic monomers, in particular mono-vinyl substituted aromatic hydrocarbons, especially styrene;

and mixtures thereof;

c) 1 to 20% by weight, in particular from 2 to 19.8% by weight or from 2 to 19.5% by weight, more preferably 3 to 19% by weight, especially 5 to 18% by weight, based on the total weight of monomers in the monomer composition M.a, of at least one monomer M2, which is in particular selected from the group consisting of monoethylenically unsaturated monocarboxylic acids having 3 to 6 carbon atoms, and which is even more preferably selected from the group consisting of acrylic acid, methacrylic acid and mixtures of acrylic acid and methacrylic acid, with more preference given to methacrylic acid and mixtures of methacrylic acid with acrylic acid;

d) 0 to 20% by weight, in particular from 0 to 10% by weight, based on the total weight of monomers in the monomer composition M.a, of one or more monomers M3, which, if present, are in particular selected from monomers of group M3.1, M3.3 and M3.4 and especially comprise at least one monomer M3.3, in particular a combination of a monomer M3.3a and a monomer M3.3b.

As explained herein, by choosing proper monomers $M_1$, $M_2$ ... $Mn$ and their mass fractions $x_1$, $x_2$, ... $x_n$ in the monomer composition M.a, the glass transition temperature of the resulting polymer can be adjusted, so to arrive at the desired glass transition temperature Tg(A). Preferably, the monomer composition M.a is chosen such that the Tg(A) is in the range of 0 to 150° C., in particular in the range of 25 to 150° C., more preferably in the range of 50 to 150° C.

The monomer composition M.b, which is polymerized in the second polymerization step preferably consists of ethylenically unsaturated monomer(s) selected from the monomers M. Preferably, the monomer composition M.b comprises at least 70% by weight, more preferably at least 90% by weight, more preferably at least 99% by weight, based on the total weight of the monomers, of monomers M which are selected from monomers M1, M2, and M3 and mixtures thereof.

Preferably, the monomer composition M.b comprises at most 1% by weight, more preferably at most 0.2% by weight, based on the total weight of the monomer composition, of monomers M0. In particular, the monomer composition M.b does not comprise any of monomers M0.

In particular, the monomer composition M.b comprises at most 1% by weight, more preferably at most 0.2% by weight, more preferably at most 0.1% by weight, based on the total weight of the monomer composition, of monomers M2. In particular, the monomer composition M.b does not comprise any of monomers M2.

Preferably, the monomer composition M.b comprises
a) 80 to 100% by weight, in particular from 90 to 100% by weight, based on the total weight of the monomers in the monomer composition M.b, of at least one monomer M1, which is in particular selected from the group consisting of
$C_1$-$C_{10}$-alkyl esters of acrylic acid, in particular ethyl acrylate, n-butyl acrylate, sec-butyl acrylate, isobutyl acrylate, tert-butyl acrylate, n-hexyl acrylate, n-octyl acrylate, 2-ethylhexyl acrylate, 2-propylheptyl acrylate and mixtures thereof, such as mixtures of n-butyl acrylate and 2-ethylhexylacrylate or mixtures of n-butyl acrylate and ethyl acrylate or mixtures of ethyl acrylate, n-butyl acrylate, tert-butyl acrylate and 2-ethylhexyl acrylate;
$C_1$-$C_4$-alkyl esters of methacrylic acid, such as methyl methacrylate, ethyl methacrylate, n-butyl methacrylate, tert-butyl methacrylate, in particular methyl methacrylate and butyl methacrylate;
vinyl aromatic monomers, in particular mono-vinyl substituted aromatic hydrocarbons, especially styrene;
and mixtures thereof;

b) not more than 2% by weight, in particular not more than 1% by weight, especially not more than 0.5% by weight, based on the total weight of the monomers in the monomer composition M.b, of one or more monomers M2, which, if present are in particular selected from the group consisting of monoethylenically unsaturated monocarboxylic acids having 3 to 6 carbon atoms, and which is even more preferably selected from the group consisting of is acrylic acid, methacrylic acid and mixture of acrylic acid and methacrylic acid, with more preference given to methacrylic acid and mixtures of methacrylic acid with acrylic acid;

c) 0 to 20% by weight, in particular from 0 to 10% by weight, based on the total weight of the monomers in the monomer composition M.b, of one or more monomers M3, which, if present, are in particular selected from monomers of group M3.3, M3.4, M3.6, and M3.8 and especially comprise at least one monomer M3.3.

Especially, the monomer composition M.b consists of one or more monomers M1 or of a mixture of monomers M1 and M3. The monomer composition M.b thus comprises in particular
a) 90 to 100% by weight, based on the total weight of the monomer composition M.b, of at least one monomer M1, and
c) 0 to 10% by weight, based on the total weight of the monomer composition M.b, of at least one monomer M3.

Preferred monomers M3 are those mentioned above. Particularly preferred, these monomers M3 comprised in M.b are selected from monomers M3.3, M3.6 and monomers M3.8. More particularly preferred, the monomers M3, if present in the monomer composition M.b, are selected from the group consisting of acetoacetoxyethyl acrylate, acetoacetoxyethyl methacrylate, allyl acrylate, allyl methacrylate, glycidyl acrylate, glycidyl methacrylate and allyl glycidyl ether.

As explained herein, by choosing proper monomers $M_1$, $M_2$ ... $Mn$ and their mass fractions $x_1$, $x_2$, ... $x_n$ in the monomer composition M.b, the glass transition temperature of the resulting polymer can be adjusted, so to arrive at the desired glass transition temperature Tg(B). Preferably, the monomer composition M.b is chosen such that the t difference Tg(A)-Tg(B) is at least 10 K. In particular, Tg(B) is in the range of −50 to 120, preferably in the range of −30 to 80° C.

The relative amount of monomers in the monomer compositions M.a and M.b are preferably chosen such that the monomers M comprise
5 to 95% by weight, in particular 5 to 50% by weight, especially 10 to 50% by weight, based on the total amount of the monomers M, of the monomer composition M.a and
5 to 95% by weight, in particular 50 to 95% by weight, especially 50 to 90% by weight, based on the total amount of the monomers M, of the monomers composition M.b.

The process according to the invention comprises
i) a first polymerization step which is performed as an aqueous radical emulsion polymerization of a first monomer composition M.a, followed by
ii) neutralizing at least 50% of the carboxylic groups derived from monomers M2 of the polymer of step i) by addition of a base, and subsequently
iii) a second polymerization step which is performed as an aqueous radical emulsion polymerization of a second monomer composition M.b in the presence of the polymer of step ii), and optionally one or more further polymerization steps which are performed as an aqueous radical emulsion polymerization of a third or further monomer composition M.b'.

In the context, all statements made in regard of the monomer composition M.b also apply to the monomer composition M.b'. The monomer composition M.b of the second polymerization step may, however, be identical with or different from the monomer compositions M.b' polymerized in the third or further polymerization steps.

Usually, any base can be used as base in step ii). Preferably, the base is a volatile base, which means that it evaporates upon drying of the polymer dispersions. Of course, a mixture of at least two different bases can be used as well. In this case, preferably at least one of the bases is volatile and more preferably, all bases that are used in step ii) are volatile bases. The term volatile base is understood that the base has a boiling point at atmospheric pressure (i.e. 1 bar) that does not exceed 250° C., in particular 200° C.

In a preferred embodiment, the base that is selected from ammonia,
primary, secondary, and tertiary organic amines, such as ethylamine, propylamine, monoisopropylamine, monobutylamine, hexylamine, ethanolamine, dimethylamine, diethylamine, di-n-propylamine, tributylamine, dimethoxyethyl-amine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, dimethylaminopropylamine, neopentanediamine, hexamethylenediamine, 4,9-dioxadodecane-1,12-diamine.

In particular, the base that is used in step ii) is ammonia.

The base can be added as pure base or as an aqueous solution. Typical concentrations of the aqueous solutions have a concentration in the range of 10 to 30 wt.-%. Of course, other concentrations are suitable as well.

Preferably, the base is added in step ii) to obtain a pH in the range of 5 to 10, preferably in the range of 6 to 9.

According to the invention, the monomer compositions M.a, M.b and any further monomer composition M.b' are polymerized by aqueous radical emulsion polymerization. Aqueous radical emulsion polymerizations are known to a skilled person and are well described in the literature.

The conditions required for the performance of the radical emulsion polymerization of the monomers M are sufficiently familiar to those skilled in the art, for example from the prior art cited at the outset and from "Emulsionspolymerisation" [Emulsion Polymerization] in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer [Dispersions of Synthetic High Polymers], F. Hölscher, Springer-Verlag, Berlin (1969)].

The free-radically initiated aqueous emulsion polymerization is triggered by means of a free-radical polymerization initiator (free-radical initiator). These may, in principle, be peroxides or azo compounds. Of course, redox initiator systems are also useful. Peroxides used may, in principle, be inorganic peroxides, such as hydrogen peroxide or peroxodisulfates, such as the mono- or di-alkali metal or ammonium salts of peroxodisulfuric acid, for example the mono- and disodium, -potassium or ammonium salts, or organic peroxides, such as alkyl hydroperoxides, for example tert-butyl hydroperoxide, p-methyl hydroperoxide or cumyl hydroperoxide, and also dialkyl or diaryl peroxides, such as di-tert-butyl or di-cumyl peroxide. Azo compounds used are essentially 2,2'-azobis(isobutyronitrile), 2,2'-azobis(2,4-dimethylvaleronitrile) and 2,2'-azobis(amidinopropyl) dihydrochloride (AIBA, corresponds to V-50 from Wako Chemicals). Suitable oxidizing agents for redox initiator systems are essentially the peroxides specified above. Corresponding reducing agents which may be used are sulfur compounds with a low oxidation state, such as alkali metal sulfites, for example potassium and/or sodium sulfite, alkali metal hydrogensulfites, for example potassium and/or sodium hydrogensulfite, alkali metal metabisulfites, for example potassium and/or sodium metabisulfite, formaldehydesulfoxylates, for example potassium and/or sodium formaldehydesulfoxylate, alkali metal salts, specifically potassium and/or sodium salts of aliphatic sulfinic acids and alkali metal hydrogensulfides, for example potassium and/or sodium hydrogensulfide, salts of polyvalent metals, such as iron(II) sulfate, iron(II) ammonium sulfate, iron(II) phosphate, ene diols, such as dihydroxymaleic acid, benzoin and/or ascorbic acid, and reducing saccharides, such as sorbose, glucose, fructose and/or dihydroxyacetone.

Preferred free-radical initiators are inorganic peroxides, especially peroxodisulfates, and redox initiator systems.

In general, the amount of the free-radical initiator used, based on the total amount of monomers M, is 0.01 to 5 pphm, preferably 0.1 to 3 pphm.

The amount of free-radical initiator required in the process of the invention for the emulsion polymerization of steps i) and iii), thus the first and the second polymerization step, can be initially charged in the polymerization vessel completely. However, it is also possible to charge none of or merely a portion of the free-radical initiator, for example not more than 30% by weight, especially not more than 20% by weight, based on the total amount of the free-radical initiator required in the aqueous polymerization medium and then, under polymerization conditions, during the free-radical emulsion polymerization of the monomer compositions M.a and M.b to add the entire amount or any remaining residual amount, according to the consumption, batchwise in one or more portions or continuously with constant or varying flow rates.

The free-radical aqueous emulsion polymerization of the invention is usually conducted at temperatures in the range from 0 to 170° C. Temperatures employed are frequently in the range from 50 to 120° C., in particular in the range from 60 to 120° C. and especially in the range from 70 to 110° C.

The free-radical aqueous emulsion polymerization of the invention can be conducted at a pressure of less than, equal to or greater than 1 atm (atmospheric pressure), and so the polymerization temperature may exceed 100° C. and may be up to 170° C. Polymerization of the monomers is normally performed at ambient pressure but it may also be performed under elevated pressure. In this case, the pressure may assume values of 1.2, 1.5, 2, 5, 10, 15 bar (absolute) or even higher values. If emulsion polymerizations are conducted under reduced pressure, pressures of 950 mbar, frequently of 900 mbar and often 850 mbar (absolute) are established. Advantageously, the free-radical aqueous emulsion polymerization of the invention is conducted at ambient pressure (about 1 atm) with exclusion of oxygen, for example under an inert gas atmosphere, for example under nitrogen or argon.

The polymerization of the monomer compositions M.a and M.b can optionally be conducted in the presence of chain transfer agents, which are different from monomers M0, which may also be considered as chain transfer agents. Chain transfer agents are understood to mean compounds that transfer free radicals and which reduce the molecular weight of the polymer or control chain growth in the polymerization. In particular, such chain transfer agents to not have a polymerizable, ethylenically unsaturated double bond. Examples of chain transfer agents are aliphatic and/or araliphatic halogen compounds, for example n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary or tertiary aliphatic thiols, for example ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and the isomeric compounds thereof, n-octanethiol and the isomeric compounds thereof, n-nonanethiol and the isomeric compounds thereof, n-decanethiol and the isomeric compounds thereof, n-undecanethiol and the isomeric compounds thereof, n-dodecanethiol and the isomeric compounds thereof, n-tridecanethiol and isomeric compounds thereof, substituted thiols, for example 2-hydroxyethanethiol, aromatic thiols, such as benzenethiol, ortho-, meta- or para-methylbenzenethiol, alkylesters of mercaptoacetic acid (thioglycolic acid), such as 2-ethylhexyl thioglycolate, alkylesters of mercaptopropionic acid, such as octyl mercapto propionate, and also further sulfur compounds described in Polymer Handbook, 3rd edition, 1989, J. Brandrup and E. H. Immergut, John Wiley & Sons, section II, pages 133 to 141, but also aliphatic and/or aromatic aldehydes, such as acetaldehyde, propionaldehyde and/or benzaldehyde, unsaturated fatty acids, such as oleic acid or hydrocarbons having readily abstractable hydrogen atoms, for example toluene. Any further chain transfer agent is preferably selected from organic thio compounds, such as primary, secondary or tertiary aliphatic thiols, substituted thiols, for example 2-hydroxyethanethiol, alkylesters of mercaptoacetic acid (thioglycolic acid), such as 2-ethylhexyl thioglycolate, and alkylesters of mercaptopropionic acid, such as octyl mercapto propionate. Preference is given in particular to the $C_1$-$C_{10}$ alkyl esters of mercaptoacetic acid and to the $C_1$-$C_{10}$ alkyl esters of mercaptopropionic acid. If present, any further chain transfer agent is used in an amount from 0.01 to 5% by weight, in particular in an amount from 0.1 to 3% by weight, based on the total amount of monomers M polymerized in all steps of the process.

Alternatively, it is possible to use mixtures of the aforementioned chain transfer agents that do not disrupt one another. The total amount of chain transfer agents optionally used in the step i) of the process of the invention, based on the total amount of monomers M.a, will generally not exceed 7% by weight, in particular 5% by weight. Likewise, the total amount of chain transfer agents optionally used in the step iii) of the process of the invention, based on the total amount of monomers M.b, will generally not exceed 2% by weight, in particular 1% by weight. However, higher amounts are suitable in certain cases. Likewise, it is also possible that during a certain period of the polymerization reaction the amount of chain transfer agent added to the polymerization reaction may exceed the value of 1% by weight, based on the total amount of monomers.

Preferably, the monomers M are polymerized by aqueous radical emulsion polymerization in the presence of at least one emulsifier E. This emulsifier serves for stabilizing the emulsion of the monomers and the polymer particles of the polymer latex. In addition to the emulsifier E, a polymer surfactant, also termed "protective colloid", may also be present during the process of the invention. Protective colloids, as opposed to emulsifiers, are understood to mean polymeric compounds having molecular weights above 2000 g/mol, whereas emulsifiers typically have lower molecular weights. The emulsifier E may be anionic or nonionic or mixtures of non-ionic and anionic emulsifiers.

Anionic emulsifiers usually bear at least one anionic group, which is selected from phosphate, phosphonate, sulfate and sulfonate groups. The anionic emulsifiers, which bear at least one anionic group, are typically used in the form of their alkali metal salts, especially of their sodium salts or in the form of their ammonium salts.

Preferred anionic emulsifiers are anionic emulsifiers, which bear at least one sulfate or sulfonate group. Likewise, anionic emulsifiers, which bear at least one phosphate or phosphonate group may be used, either as sole anionic emulsifiers or in combination with one or more anionic emulsifiers, which bear at least one sulfate or sulfonate group.

Examples of anionic emulsifiers, which bear at least one sulfate or sulfonate group, are, for example,
- the salts, especially the alkali metal and ammonium salts, of alkyl sulfates, especially of $C_8$-$C_{22}$-alkyl sulfates,
- the salts, especially the alkali metal and ammonium salts, of sulfuric monoesters of $C_2$-$C_3$-alkoxylated alkanols, especially of sulfuric monoesters of $C_2$-$C_3$-alkoxylated $C_8$-$C_{22}$-alkanols, preferably having an $C_2$-$C_3$-alkoxylation level (AO level) in the range from 2 to 40,
- the salts, especially the alkali metal and ammonium salts, of sulfuric monoesters of $C_2$-$C_3$-alkoxylated alkylphenols, especially of sulfuric monoesters of $C_2$-$C_3$-alkoxylated $C_4$-$C_{18}$-alkylphenols (AO level preferably 3 to 40),
- the salts, especially the alkali metal and ammonium salts, of alkylsulfonic acids, especially of $C_8$-$C_{22}$-alkylsulfonic acids,
- the salts, especially the alkali metal and ammonium salts, of dialkyl esters, especially di-$C_4$-$C_{18}$-alkyl esters of sulfosuccinic acid,
- the salts, especially the alkali metal and ammonium salts, of alkylbenzenesulfonic acids, especially of $C_4$-$C_{22}$-alkylbenzenesulfonic acids, and
- the salts, especially the alkali metal and ammonium salts, of mono- or disulfonated, alkyl-substituted diphenyl ethers, for example of bis(phenylsulfonic acid) ethers bearing a $C_4$-$C_{24}$-alkyl group on one or both aromatic rings. The latter are common knowledge, for example from U.S. Pat. No. 4,269,749, and are commercially available, for example as Dowfax® 2A1 (Dow Chemical Company).

The above mentioned term $C_2$-$C_3$-alkoxylated means that the compounds are ethoxylated, propoxylated or co-ethoxylated/propoxylated. In other words, the term $C_2$-$C_3$-alkoxylated means that the respective compounds are obtained by a process which introduces a polyethylenoxide group, a polypropyleneoxide group or a poly(ethyleneoxide-co-propyleneoxide) group.

Examples of anionic emulsifiers, which bear a phosphate or phosphonate group, include but are not limited to the following salts, are selected from the following groups:

- the salts, especially the alkali metal and ammonium salts, of mono- and dialkyl phosphates, especially $C_8$-$C_{22}$-alkyl phosphates,
- the salts, especially the alkali metal and ammonium salts, of phosphoric monoesters of $C_2$-$C_3$-alkoxylated alkanols, preferably having an alkoxylation level in the range from 2 to 40, especially in the range from 3 to 30, for example phosphoric monoesters of ethoxylated $C_8$-$C_{22}$-alkanols, preferably having an ethoxylation level (EO level) in the range from 2 to 40, phosphoric monoesters of propoxylated $C_8$-$C_{22}$-alkanols, preferably having a propoxylation level (PO level) in the range from 2 to 40, and phosphoric monoesters of ethoxylated-co-propoxylated $C_8$-$C_{22}$-alkanols, preferably having an ethoxylation level (EO level) in the range from 1 to 20 and a propoxylation level of 1 to 20,
- the salts, especially the alkali metal and ammonium salts, of phosphoric monoesters of $C_2$-$C_3$-alkoxylated alkylphenols, especially phosphoric monoesters of $C_2$-$C_3$-alkoxylated $C_4$-$C_{18}$-alkylphenols (AO level preferably 3 to 40),
- the salts, especially the alkali metal and ammonium salts, of alkylphosphonic acids, especially $C_8$-$C_{22}$-alkylphosphonic acids and
- the salts, especially the alkali metal and ammonium salts, of alkylbenzenephosphonic acids, especially $C_4$-$C_{22}$-alkylbenzenephosphonic acids.

Preferred anionic emulsifiers E are selected from the following groups:

- the salts, especially the alkali metal and ammonium salts, of alkyl sulfates, especially of $C_8$-$C_{22}$-alkyl sulfates,
- the salts, especially the alkali metal salts, of sulfuric monoesters of $C_2$-$C_3$-alkoxylated alkanols, especially of sulfuric monoesters of $C_2$-$C_3$-alkoxylated $C_8$-$C_{22}$-alkanols, preferably having an AO level in the range from 2 to 40,
- of sulfuric monoesters of $C_2$-$C_3$-alkoxylated alkylphenols, especially of sulfuric monoesters of $C_2$-$C_3$-alkoxylated $C_4$-$C_{18}$-alkylphenols (AO level preferably 3 to 40),
- of alkylbenzenesulfonic acids, especially of $C_4$-$C_{22}$-alkylbenzenesulfonic acids, and
- of mono- or disulfonated, alkyl-substituted diphenyl ethers, for example of bis(phenylsulfonic acid) ethers bearing a $C_4$-$C_{24}$-alkyl group on one or both aromatic rings.

Suitable emulsifiers E may also be nonionic emulsifiers. Suitable nonionic emulsifiers are e.g. araliphatic or aliphatic nonionic emulsifiers, for example

- $C_2$-$C_3$-alkoxylated mono-, di- and trialkylphenols (AO level: 3 to 50, alkyl radical: C4-C10),
- $C_2$-$C_3$-alkyoxlates, thus ethoxylates, propoxylates or ethoxylate-co-propoxylates, of long-chain alcohols (AO level: 3 to 100, alkyl radical: $C_8$-$C_{36}$), and
- polyethylene oxide/polypropylene oxide homo- and copolymers. These may comprise the alkylene oxide units copolymerized in random distribution or in the form of blocks.

Amongst nonionic emulsifiers, preference is given to $C_2$-$C_3$-alkoxylated of long-chain alkanols, in particular to those where the alkyl radical $C_8$-$C_{30}$ having a mean alkoxylation level of 5 to 100 and, among these, particular preference to those having a linear $C_{12}$-$C_{20}$ alkyl radical and a mean alkoxylation level of 10 to 50, and also to $C_2$-$C_3$-alkoxylated monoalkylphenols.

Furthermore, copolymerizable emulsifiers might be used as well. Suitable copolymerizable emulsifiers are for example disclosed in WO 2016/042116. Such copolymerizable emulsifiers usually have an ethylenically unsaturated moiety which is polymerizable and/or copolymerizable.

A first group of copolymerizable emulsifiers are phosphate esters of polyethylene glycol and monoacrylates and/or phosphonate esters of polyethylene glycol monoacrylates. Commercially available products are Maxemul® and Sipomer® PAM emulsifiers. Another group of copolymerizable emulsifiers are polyoxyalkylenealkenyl ether sulfates. Commercially available products are Latemul® PD emulsifiers. Another group of copolymerizable emulsifiers are branched unsaturated alkyl alkoxysulfonates and/or branched unsaturated alkyl alkoxysulfates. Commercially available products are Adeka® Reasoap emulsifiers.

Such copolymerizable emulsifiers are usually used in rather small quantities.

Preferably, the emulsifier E comprises at least one anionic emulsifier, which bears at least one sulfate or sulfonate group. The at least one anionic emulsifier, which bears at least one sulfate or sulfonate group, may be the sole type of anionic emulsifiers. However, mixtures of at least one anionic emulsifier, which bears at least one sulfate or sulfonate group, and at least one anionic emulsifier, which bears at least one phosphate or phosphonate group, may also be used. In such mixtures, the amount of the at least one anionic emulsifier, which bears at least one sulfate or sulfonate group, is preferably at least 50% by weight, based on the total weight of anionic surfactants used in the process of the present invention. In particular, the amount of anionic emulsifiers, which bear at least one phosphate or phosphonate group does not exceed 20% by weight, based on the total weight of anionic surfactants used in the process of the present invention.

Preferably, the emulsifiers E comprise less than 20% by weight, especially not more than 10% by weight, of nonionic surfactants, based on the total amount of emulsifiers E used in the process of the present invention, and especially do not comprise any nonionic surfactant. In another embodiment of the invention, the surfactants used in the process of the present invention comprise at least one anionic surfactant and at least one non-ionic surfactant, the ratio of anionic surfactants to non-ionic surfactants being usually in the range form 0.5:1 to 10:1, in particular from 1:1 to 5:1.

Preferably, the emulsifier E will be used in such an amount that the amount of emulsifier is in the range from 0.2 to 5% by weight, especially in the range from 0.3 to 3% by weight, based on the total amount of monomers M polymerized in the process of the present invention.

Of course, further surfactants which are different from the emulsifiers E may additionally be used in the process of the present invention. Further suitable surfactants can be found in Houben-Weyl, Methoden der organischen Chemie [Methods of Organic Chemistry], volume XIV/1, Makromolekulare Stoffe [Macromolecular Substances], Georg-Thieme-Verlag, Stuttgart, 1961, p. 192-208. For example, suitable further surfactants are e.g. copolymerizable surfactants, such as allyl and vinyl ethers of capped or non-capped polyethylene glycols and also esters of acrylic acid or methacrylic acid with OH-functional capped or non-capped polyethylene glycols, for example the Bisomer product range of GEO Specialty Chemicals.

The emulsifier E is usually present at the first polymerization step and/or at the second polymerization step. Preferably, an emulsifier E is present in the first and the second polymerization step, where the emulsifier might be same or different. More preferably, at least one emulsifier E is present in both the first and the second polymerization step.

According to the invention, the radical emulsion polymerization of the monomers M, in particular the monomer composition M.a of the first polymerization step, but frequently also the monomer composition(s) M.b of the second or further polymerization step, is performed by a so-called feed process, which means that at least 95%, in particular at least 98% or the total amount of the respective monomer composition M.a and M.b to be polymerized are metered to the polymerization reaction under polymerization conditions during a metering period. It is apparent that together with the monomer composition, at least a portion of the emulsifier E is also metered to the polymerization reaction during the period.

The term "polymerization conditions" is generally understood to mean those temperatures and pressures under which the free-radically initiated aqueous emulsion polymerization proceeds at sufficient polymerization rate. They depend particularly on the free-radical initiator used. Advantageously, the type and amount of the free-radical initiator, polymerization temperature and polymerization pressure are selected such that a sufficient amount of initiating radicals is always present to initiate or to maintain the polymerization reaction.

The free-radical emulsion polymerization of the invention is usually effected in an aqueous polymerization medium, which, as well as water, comprises at least one surface-active substance, so-called surfactants, for stabilizing the emulsion of the monomers and the polymer particles of the polymer latex. Suitable surfactants are mentioned herein.

It is frequently advantageous when the aqueous polymer dispersion obtained on completion of polymerization of the monomers M is subjected to a post-treatment to reduce the residual monomer content. This post-treatment is effected either chemically, for example by completing the polymerization reaction using a more effective free-radical initiator system (known as post-polymerization), and/or physically, for example by stripping the aqueous polymer dispersion with steam or inert gas. Corresponding chemical and physical methods are familiar to those skilled in the art, for example from EP 771328 A, DE 19624299 A, DE 19621027 A, DE 19741184 A, DE 19741187 A, DE 19805122 A, DE 19828183 A, DE 19839199 A, DE 19840586 A and DE 19847115 A. The combination of chemical and physical post-treatment has the advantage that it removes not only the unconverted ethylenically unsaturated monomers but also other disruptive volatile organic constituents (VOCs) from the aqueous polymer dispersion.

Furthermore, it might be suitable to formulate the polymer dispersion with a post-curing agent. Ideally, such a post-curing agent, also termed as post-crosslinking agent, will result in a crosslinking reaction during and/or after film formation by forming coordinative or covalent bonds with reactive sites on the surface of the polymer particles.

Crosslinking agents, which are suitable for providing post crosslinking, are for example compounds having at least two functional groups selected from oxazoline, amino, aldehyde, aminoxy, carbodiimide, aziridinyl, epoxy and hydrazide groups, derivatives or compounds bearing acetoacetyl groups. These crosslinkers react with reactive sites of the polymers of the polymer dispersion which bear complementary functional groups in the polymer, which are capable of forming a covalent bond with the crosslinker.

Suitable systems are known to skilled persons. Alternatively, post-crosslinking can be achieved by the addition of inorganic salts of polyvalent metals, in particular the halides and sulfates of calcium or zinc.

As the polymers contained in the polymer dispersion of the invention bear carboxyl groups, post-crosslinking can be achieved by formulation of the polymer dispersion with one or more polycarbodiimides as described in U.S. Pat. Nos. 4,977,219, 5,047,588, 5,117,059, EP 0277361, EP0507407, EP0628582, U.S. Pat. No. 5,352,400, US 2011/0151128 and US 2011/0217471. It is assumed that crosslinking is based on the reaction of the carboxyl groups of the polymers with polycarbodiimides. The reaction typically results in covalent cross-links which are predominately based on N-acyl urea bounds (J. W. Taylor and D. R. Bassett, in E. J. Glass (Ed.), Technology for Waterborne Coatings, ACS Symposium Series 663, Am. Chem. Soc., Washington, DC, 1997, chapter 8, pages 137 to 163).

Likewise, as the polymer particles contained in the polymer dispersion of the present invention bear carboxyl groups stemming from monomers M2, a suitable post-curing agent may also be a water-soluble or water-dispersible polymer bearing oxazoline groups, e.g. the polymers as described in U.S. Pat. No. 5,300,602 and WO 2015/197662.

Post crosslinking can also be achieved by analogy to EP 1227116, which describes aqueous two-component coating compositions containing a binder polymer with carboxylic acid and hydroxyl functional groups and a polyfunctional crosslinker having functional groups selected from isocyanate, carbodiimide, aziridinyl and epoxy groups.

If the polymer in the polymer dispersion bears a keto group, e.g. by using a monomer M3.3b, such as diacetone acrylamide (DAAM), post-crosslinking can be achieved by formulating the aqueous polymer dispersion with one or more dihydrazides, in particular aliphatic dicarboxylic acid, such as adipic acid dihydrazide (ADDH), as described in U.S. Pat. No. 4,931,494, US 2006/247367 and US 2004/143058. These components react basically during and after film formation, although a certain extent of preliminary reaction can occur.

Further reversible crosslinking systems are based on metal- or semi-metal compounds, e.g. metal salts of polyvalent metals, such as zinc, or semi-metal compounds, such as alkyl silicates, boric acid and the like. These metal or semi-metal compounds may react with functional groups on the surface of the polymer particles, such as hydroxyl, carboxylate or carboxamide groups, thereby resulting in a crosslinking of the polymer particles. Suitable systems are e.g. described in EP 0709441.

Other suitable agents of achieving post-curing include
epoxysilanes to crosslink carboxy groups in the polymer;
dialdehydes, such as glyoxal to crosslink urea groups or acetoacetoxy groups, such as those derived from the monomers M3.3a or M3.3b as defined herein, in particular ureido (meth)acrylate or acetoacetoxyethyl (meth)acrylate; and
di- and/or polyamines to crosslink keto groups or epoxy groups, such as those derived from the monomers M3.3b or M3.8 as defined herein.

Suitable systems are e.g. described in EP 0789724, U.S. Pat. Nos. 5,516,453 and 5,498,659.

The process for producing the aqueous polymer dispersion is preferably carried out to obtain the polymer of step i) with a weight average molecular weight Mw in the range of 1000 to 50000 g/mol and/or with a polydispersity PD=Mw/Mn of <2.5.

The process is preferably carried out to obtain the polymer particles contained in the aqueous polymer dispersion with a polymer phase A formed by the monomer composition M.a and a polymer phase B formed by the monomer composition M.b. Preferably, the polymer phase A has a glass transition temperature Tg(A), and the polymer phase B has a glass transition temperature Tg(B), where the difference Tg(A)-Tg(B) is at least 10 K, where Tg(A) and Tg(B) are theoretical glass transition temperatures as determined by the Fox equation.

The monomer composition M.a forming the polymer phase A is preferably chosen such that the theoretical glass transition temperature Tg(A) is in the range of 0 to 150° C., preferably in the range of 25 to 150° C., more preferably in the range of 50 to 150° C.

The monomer composition M.b forming the polymer phase B is preferably chosen such that the theoretical glass transition temperature Tg(B) is in the range of −50 to 120° C. Therein, the difference Tg(A)-Tg(B) is at least 10 K.

Preferred embodiments of the aqueous polymer dispersions are those mentioned herein, in particular those that are described with respect to the process as described hereinabove.

The aqueous polymer dispersion preferably has a polymer solids content in the range of 35 to 55 wt.-%. The polymer content can be determined experimentally by drying 2 g of the polymer dispersion in an aluminum crucible at 1320° C. for 22 h according to ISO 124:2014(en).

The aqueous polymer dispersion preferably comprises polymer particles contained in the aqueous polymer dispersion, where the polymer particles have a polymer phase A formed by the monomer composition M.a and a polymer phase B formed by the monomer composition M.b.

The aqueous polymer dispersion preferably comprises polymer particles having at least two glass transition temperatures, namely a higher glass transition temperature Tg(A) and the lower glass transition temperature Tg(B). Of course, the particles might also have a further glass transition temperature Tg(C), which might be above Tg(A), between Tg(A) and Tg(B) or below Tg(B).

Preferably, the polymer phase A has a glass transition temperature Tg(A), and the polymer phase B has a glass transition temperature Tg(B), where the difference Tg(A)-Tg(B) is at least 10 K, where Tg(A) and Tg(B) are theoretical glass transition temperatures as determined by the Fox equation.

Further preferred, the glass transition temperature Tg(A) is in the range of 0 to 150° C., preferably in the range of 25 to 150° C., more preferably in the range of 50 to 150° C., and/or the glass transition temperature Tg(B) is in the range of −50 to 120° C., preferably in the range of −30 to 80° C., with the proviso that the difference Tg(A)-Tg(B) is at least 10 K. In a preferred embodiment, the polymer particles preferably have a glass transition temperature Tg(A) which is in the range of 0 to 150° C., preferably in the range of 25 to 150° C., more preferably in the range of 50 to 150° C. and
a glass transition temperature Tg(B) which is in the range of −50 to 120° C., preferably in the range of −30 to 80° C.

In a preferred embodiment, the polymer particles contained in the polymer dispersion obtained by the process as described herein comprise 5 to 95 wt.-%, preferably 5 to 70 wt.-%, preferably 10 to 60 wt.-%, based on the total weight of the polymer particles, of the polymer phase having the glass transition temperature Tg(A) and 5 to 95 wt.-%, preferably 30 to 95 wt.-%, preferably 40 to 90 wt.-%, based on the total weight of the polymer particles, of the polymer phase having the lower glass transition temperature Tg(B) and 0 to 50 wt.-%, preferably 0 to 40 wt.-%, preferably 0 to 30 wt.-%, based on the total weight of the polymer particles, of a polymer phase having the glass transition temperature Tg(C).

In case that the particles do not comprise a polymer phase having a glass transition temperature Tg(C), the particles comprise 5 to 95 wt.-%, preferably 5 to 50 wt.-%, preferably 10 to 50 wt.-%, based on the total weight of the polymer particles, of the polymer phase having the glass transition temperature Tg(A) and 5 to 95 wt.-%, preferably 50 to 95 wt.-%, preferably 50 to 90 wt.-%, based on the total weight of the polymer particles, of the polymer phase having the lower glass transition temperature Tg(B).

Preferably, the weight average molecular mass Mw of the polymers obtained from step i) is in the range of 1000 to 50000 g/mol with a polydispersity PD of <2.5.

The polymers obtained from step iii) or any further steps usually have a higher weight average molecular mass Mw than the polymers obtained from step i). Preferably, the weight average molecular mass Mw of the polymers obtained from step iii) are at least 15000 g/mol, more preferably at least 25000 g/mol and may be as high as $5\times10^6$ g/mol or higher. The polydispersity of the polymers obtained from step iii) can be smaller or larger than the polydispersity of the polymers obtained from step i). Preferably, the polydispersity of the polymers obtained from step iii) is larger than that of the polymers obtained from step i).

The polymers obtained from step iii) might be completely soluble in THF or not completely soluble in THE. Usually, the polymers obtained from step iii) are at least partially soluble in THE.

The volume average particle size of the year aqueous polymer dispersions according to the present invention, as determined by DLS, is typically in the range from 20 to 500 nm, in particular in the range from 20 to 300 nm and preferably in the range from 50 to 300 nm.

The aqueous polymer dispersions obtainable by the process as described herein are particularly useful for the following applications:

as a component in paints, and/or as a component in coatings, in particular clear coats, architectural coatings and/or as a binder or co-binder in a water-borne coating composition.

A particularly preferred use of the dispersions according to the invention is the use as binder or co-binder, preferably in waterborne coating compositions.

Preferred embodiments are those mentioned herein, in particular those that are described with respect to the process as described herein.

A further object of the present invention is a water-borne coating composition containing a dispersion of polymerized ethylenically unsaturated monomers M obtainable by the process as described herein.

Water-borne coating compositions include both water-borne paints and water-borne clear coats.

Water-borne paints usually contain, in addition to the polymer dispersion, at least one particulate solid selected from pigment and fillers, in particular at least one pigment and optionally at least one filler. In contrast thereto, a clear coat is a water-borne coating composition, which does not contain any pigment or filler.

The water-borne composition usually comprises the aqueous polymer dispersion and water. The composition usually does not comprise any volatile organic compound. In case that volatile organic compounds are present, the concentration of said compounds is usually below 0.2 wt.-%, preferably below 0.1 wt.-%, more preferably below 0.05 wt.-%, based on the total amount of liquid composition and preferably based on the amount of polymer contained in the composition. A volatile compound in terms of the invention is a compound, which has a boiling point at 1013 mbar of less than 250° C.

Pigments for the purposes of the present invention are virtually insoluble, finely dispersed, organic or preferably inorganic colorants as per the definition in German standard specification DIN 55944. Examples of pigments are in particular inorganic pigments, such as white pigments, such as titanium dioxide (C.I. Pigment White 6), zinc white, pigment grade zinc oxide; zinc sulfide, lithopone; lead white; furthermore, white fillers, such as barium sulfate and $CaCO_3$ which are also referred to as inorganic white pigments in the context of the present invention, black pigments, such as iron oxide black (C.I. Pigment Black 11), iron manganese black, spinel black (C.I. Pigment Black 27), carbon black (C.I. Pigment Black 7);

color pigments, such as chromium oxide, chromium oxide hydrate green; chrome green (C.I. Pigment Green 48); cobalt green (C.I. Pigment Green 50); ultramarine green; cobalt blue (C.I. Pigment Blue 28 und 36); ultramarine blue, iron blue (C.I. Pigment Blue 27), manganese blue, ultramarine violet, cobalt violet, manganese violet, iron oxide read (C.I. Pigment Red 101); cadmium sulfoselenide (C.I. Pigment Red 108); molybdate read (C.I. Pigment Red 104); ultramarine read, iron oxide brown, mixed brown, spinel- and Korundum phases (C.I. Pigment Brown 24, 29 und 31), chrome orange;

iron oxide yellow (C.I. Pigment Yellow 42); nickel titanium yellow (C.I. Pigment Yellow 53; C.I. Pigment Yellow 157 und 164); chrome titanium yellow; cadmium sulfide und cadmium zinc sulfide (C.I. Pigment Yellow 37 und 35); Chrome yellow (C.I. Pigment Yellow 34), zinc yellow, alkaline earth metal chromates; Naples yellow; bismuth vanadate (C.I. Pigment Yellow 184);

interference pigments, such as metallic effect pigments based on coated metal platelets, pearl luster pigments based on mica platelets coated with metal oxide, and liquid crystal pigments.

The compositions may also comprise mixtures of two or more different pigments, in which case it is preferable that at least one pigment be inorganic. The pigments are usually in particulate form, i.e., in the form of particles. Pigments can be selected from crude pigments, i.e., untreated as-synthesized pigments. The particles of pigment may be regular or irregular in shape in that, for example, the particles may have a spherical or substantially spherical shape or a needle (acicular) shape.

The water-borne coating composition may also contain one or more fillers. Examples of suitable fillers are aluminosilicates, such as feldspars, silicates, such as kaolin, talc, mica, magnesite, alkaline earth metal carbonates, such as calcium carbonate, for example in the form of calcite or chalk, magnesium carbonate, dolomite, alkaline earth metal sulfates, such as calcium sulfate, silicon dioxide, etc. In the coating compositions of the invention, finely divided fillers are naturally preferred. The fillers may be used in the form of individual components. In practice, however, filler mixtures have been found to be particularly useful, for example calcium carbonate/kaolin, calcium carbonate/talc. Gloss paints generally comprise only small amounts of very finely divided fillers, or do not comprise any fillers. Fillers also include flatting agents which significantly impair the gloss as desired. Flatting agents are generally transparent and may be either organic or inorganic. Examples of flatting agents are inorganic silicates, for example the Syloid® brands from W. R. Grace & Company and the Acematt® brands from Evonik GmbH. Organic flatting agents are obtainable, for example, from BYK-Chemie GmbH under the Ceraflour® brands and the Ceramat® brands, and from Deuteron GmbH under the Deuteron MK® brand.

The proportion of the pigments and fillers in coating compositions can be described in a manner known per se via the pigment volume concentration (PVC). The PVC describes the ratio of the volume of pigments (VP) and fillers (VF) relative to the total volume, consisting of the volumes of binder (VB), pigments (VP) and fillers (VF) in a dried coating film in percent: $PVC=(VP+VF)\times 100/(VP+VF+VB)$.

The compositions usually have a pigment volume concentration (PVC) of at least 5, especially at least 10. Preferably, the PVC will not exceed a value of 60, especially 40, and is specifically in the range from 5 to 60 or 5 to 40. However, the inventive effects of the polymer dispersions are also manifested in varnishes which typically have a pigment/filler content below 5% by weight, based on the varnish, and correspondingly have a PVC below 5.

The aqueous coating compositions of the invention may also comprise customary auxiliaries. The customary auxiliaries will depend from the kind of the coating in a well-known manner and include but are not limited to:

wetting agents or dispersants,
filming auxiliaries, also termed coalescents,
leveling agents,
biocides and
defoamers.

Suitable wetting agents or dispersants are, for example, sodium polyphosphates, potassium polyphosphates or ammonium polyphosphates, alkali metal salts and ammonium salts of acrylic acid copolymers or maleic anhydride copolymers, polyphosphonates, such as sodium 1-hydroxyethane-1,1-diphosphonate, and naphthalenesulfonic salts, especially the sodium salts thereof.

Suitable filming auxiliaries are solvents and plasticizers. Plasticizers, in contrast to solvents, have a low volatility and preferably have a boiling point at 1013 mbar of higher than 250° C. while solvents have a higher volatility than plasticizers and preferably have a boiling point at 1013 mbar of less than 250° C. Suitable filming auxiliaries are, for example, white spirit, pine oil, propylene glycol, ethylene glycol, butyl glycol, butyl glycol acetate, butyl glycol diacetate, butyl diglycol, butylcarbitol, 1-methoxy-2-propanol, 2,2,2-trimethyl-1,3-pentanediol monoisobutyrate (Texanol®) and the glycol ethers and esters, commercially available, for example, from BASF SE under the Solvenon® and Lusolvan® and Loxanol® names, and from Dow under the Dowanol® trade name. The amount is preferably <5% by weight and more preferably <1% by weight, based on the overall formulation. Formulation is also possible completely without filming auxiliaries. If the coating compositions contain filming auxiliaries, these are preferably selected from plasticizers. Frequently, the coating compositions do not require any filming auxiliaries.

Further suitable auxiliaries and components are e.g. described by J. Bieleman in "Additives for Coatings", Whiley-VCH, Weinheim 2000; by T. C. Patton in "Paint Flow and Pigment Dispersions", 2. Edition, John Whiley & Sons 1978; and by M. Schwartz and R. Baumstark in "Water based Acrylates for Decorative Coatings", Curt R. Vincentz Verlag, Hanover 2001.

In a preferred embodiment, the composition comprising at least one aqueous polymer dispersion as defined herein further comprises a rheology modifying agent. Suitable rheology modifying agents include associative thickener polymers and non-associative rheology modifiers. The aqueous liquid composition preferably comprises a thickening agent selected from the group consisting of associative thickeners and optionally a non-associative thickener.

The present invention also relates to a method of producing a coating on a surface. This method will usually comprise
  (a) applying a composition comprising a dispersion of polymerized ethylenically unsaturated monomers M obtainable by the process as described herein to the surface, and
  (b) allowing the composition to dry to produce the coating.

Preferred embodiments are those mentioned herein, in particular those that are described with respect to the process as described herein.

If the liquid composition is a paint, the paint can be used for providing a decorative coating on arbitrary surfaces, in particular for coatings of interior or exterior walls or ceilings or for coating wood, metal and plastic. The latex paint may be applied to substrates to be coated in a customary manner, for example by applying the paint with brushes or rollers, by spraying, by dipping, by rolling, or by bar coating.

In this case, the coating of substrates is affected in such a way that the substrate is first coated with an aqueous coating formulation of the invention and then the aqueous coating is subjected to a drying step, especially within the temperature range of $\geq -10$ and $\leq 50°$ C., advantageously $\geq 5$ and $\leq 40°$ C. and especially advantageously $\geq 10$ and $\leq 35°$ C.

EXAMPLES

The invention is to be illustrated by non-limiting examples which follow.

1. Analytics
1.1 Solids Content

The solids content was determined by drying a defined amount of the aqueous polymer dispersion (about 2 g) to constant weight in an aluminum crucible having an internal diameter of about 5 cm at 120° C. in a drying cabinet (about 2 hours). Two separate measurements were conducted. The value reported in the example is the mean of the two measurements.

1.2 Particle Diameter

The size of the particles as well as the distribution of particle size was determined by quasielastic light scattering (QELS), also known as dynamic light scattering (DLS). The measurement method is described in the ISO 13321:1996 standard. The determination can be carried out using a High-Performance Particle Sizer (HPPS). Details are mentioned hereinabove.

1.3 Glass Transition Temperature

The glass transition temperature was determined by the DSC method (Differential Scanning Calorimetry) using the following parameters: 20 K/min, midpoint measurement, ISO 11357-2:2013 by means of a DSC instrument (Q 2000 series from TA instruments.

1.4 Molecular Weight

The molecular weight was determined by gel permeation chromatography (GPC).

Samples were dissolved in a 0.1 wt.-% solution of trifluoroacetic acid in tetrahydrofuran (THF) to a concentration of 2 mg/mL. This GPC set up consisted of a pump, a refractive index detector (Agilent 1100) and three columns in series (PLgel MIXED-B with operating range 500 Da-107 Da), as well as a guard column (PLgel). Chromatograms were obtained at 35° C. using an eluent flow rate of 1 mL/min (same eluent as for the preparation of samples). Before injection (100 µL), samples were filtered over a 0.20 µm nylon filter. The equipment was calibrated using narrow polystyrene standards, and the reported values are referred to this calibration.

1.5 Leaching

The films were casted on a polyethylene substrate with a wet thickness of 400 µm and dried at 23° C. and 55% relative humidity (r.h.) for 3 weeks.

After removal from the substrate, the films were cut in equal pieces and placed in water for 24 hours. The films were subsequently dried until constant weight to measure the amount dissolved in the aqueous phase. Reported values are expressed as weight percentages in respect to the initial films. The same films were subsequently placed in aqueous ammonia 0.1 mol/l for 24 hours, dried until constant weight to evaluate the percentages that could be solubilized in basic environment. The tests were replicated two times, and the reported values are the average of the measurements. The values can be considered with an error of ±0.1% for leaching in water and ±0.3% for leaching in aqueous ammonia 0.1 mol/l.

2. Preparations of Polymer Dispersions

Example 1 (E1)

A polymerization vessel equipped with metering devices and temperature regulation was charged at 20 to 25° C. (room temperature) with 527.0 g of deionized water and 8.3 g of a 15% strength by weight aqueous solution of sodium lauryl sulfate, and this initial charge was heated to 95° C. under moderate nitrogen stream with stirring. When that temperature had been reached, 8.9 g of a 7% strength by weight aqueous solution of sodium peroxodisulfate were added, and the batch was stirred for five minutes. Subsequently, with the temperature maintained, 10.9 g of a 7% strength by weight aqueous solution of sodium peroxodisulfate were metered in parallel with feed stream 1 over the course of 40 minutes at a constant flow rate. After the end of both feed streams, a small sample was taken from the vessel to measure the distribution of molecular weights of the produced polymer, and the polymerization mixture was then left to react at 95° C. for 10 minutes more.

After that, it was admixed with 22.1 g of a 25% strength by weight aqueous ammonia solution. The mixture was then left to react at 95° C. for other 10 minutes more. Subsequently, 24.5 g of a 7% strength by weight aqueous solution of sodium peroxodisulfate were metered in parallel with feed stream 2 over the course of 90 minutes at a constant flow rate. After the end of both feed streams the polymerization mixture was then left to react at 95° C. for further 60 minutes.

Thereafter, the aqueous polymer dispersion obtained was cooled to room temperature and filtered through a 260 μm filter.

Feed Stream 1 (Homogeneous Mixture of):
130.2 g of deionized water
7.0 g of a 15% strength by weight aqueous solution of sodium lauryl sulfate
11.7 g of ethyl 2-(bromomethyl)acrylate
139.5 g of butyl methacrylate
18.6 g of styrene
27.9 g of methacrylic acid Feed Stream 2 (Homogeneous Mixture of):
229.4 g of deionized water
9.5 g of a 15% strength by weight aqueous solution of sodium lauryl sulfate
434.0 g of butyl methacrylate The aqueous polymer dispersion obtained had a solids content of 40.0% by weight. The number-average molecular weight Mn of the polymer taken at the end of feed stream 1 was 2200 Da, and the weight-average molecular weight Mw was 4600 Da, with maximum peak at 4400 Da. The number-average molecular weight Mn of the final polymer dispersion was 6200 Da, and the weight-average molecular weight Mw was 17400 Da, with maximum peak at 15800 Da.

Example 2 (E2)

The preparation of example 2 was the same as for the preparation of example 1 with the difference that in feed stream 1, 8.7 g of ethyl 2-(bromomethyl)acrylate were used instead of 11.7 g.

The aqueous polymer dispersion obtained had a solids content of 39.9% by weight. The number-average molecular weight of the polymer taken at the end of feed stream 1 was 3500 Da, and the weight-average molecular weight was 6900 Da, with a maximum peak at 7100 Da. The number-average molecular weight of the final polymer dispersion was 11600 Da, and the weight-average molecular weight was 24600 Da, with a maximum peak at 20900 Da.

Example 3 (E3)

The preparation of example 3 was the same as for the preparation of example 1 with the difference that in feed stream 1, 124.0 g of deionized water were used instead of 130.2 g, and 5.8 g of ethyl 2-(bromomethyl)acrylate were used instead of 11.7 g.

The aqueous polymer dispersion obtained had a solids content of 39.9% by weight. The number-average molecular weight of the polymer taken at the end of feed stream 1 was 5600 Da, and the weight-average molecular weight was 11900 Da, with a maximum peak at 10600 Da. The number-average molecular weight of the final polymer dispersion was 16200 Da, and the weight-average molecular weight was 29900 Da, with a maximum peak at 27500 Da.

Example 4 (E4)

The preparation of example 4 was the same as for the preparation of example 1 with the difference that in feed stream 1, 124.0 g of deionized water were used instead of 130.2 g, and 5.8 g of ethyl 2-(bromomethyl)acrylate were used instead of 11.7 g. In feed stream 2, 434.0 g of butyl acrylate were used instead of 434.0 g of butyl methacrylate.

The aqueous polymer dispersion obtained had a solids content of 39.9% by weight. The obtained polymer is almost insoluble in THF.

Example 5 (E5)

The preparation of example 5 was the same as for the preparation of example 1 with the difference that in feed stream 1, 124.0 g of deionized water were used instead of 130.2 g, and 5.8 g of ethyl 2-(bromomethyl)acrylate were used instead of 11.7 g. In feed stream 2, 217.0 g of butyl acrylate and 217.0 g of methyl methacrylate were used instead of 434.0 g of butyl methacrylate.

The aqueous polymer dispersion obtained had a solids content of 39.9% by weight. The obtained polymer is partially soluble in THF. The number-average molecular weight of the polymer dispersion (soluble part) was 6700 Da, and the weight-average molecular weight was 103000 Da, with a maximum peak at 61100 Da.

Example 6 (E6)

The preparation of example 6 was the same as for the preparation of example 1 with the difference that in feed stream 1, 124.0 g of deionized water were used instead of 130.2 g, and 5.8 g of ethyl 2-(bromomethyl)acrylate were used instead of 11.7 g. In feed stream 2, 86.8 g of butyl acrylate and 347.2 g of butyl methacrylate were used instead of 434.0 g of butyl methacrylate.

The aqueous polymer dispersion obtained had a solids content of 39.9% by weight. The obtained polymer is partially soluble in THF. The number-average molecular weight of the polymer dispersion (soluble part) was 15600 Da, and the weight-average molecular weight was 185000 Da, with a maximum peak at 67000 Da.

Example 7 (E7)

A polymerization vessel equipped with metering devices and temperature regulation was charged at 20 to 25° C. (room temperature) with 527.0 g of deionized water and 8.3 g of a 15% strength by weight aqueous solution of sodium lauryl sulfate, and this initial charge was heated to 95° C. under moderate nitrogen stream with stirring. When that temperature had been reached, 8.9 g of a 7% strength by weight aqueous solution of sodium peroxodisulfate were added, and the batch was stirred for five minutes. Subsequently, with the temperature maintained, 10.9 g of a 7% strength by weight aqueous solution of sodium peroxodisulfate were metered in parallel with feed stream 1 over the course of 40 minutes at a constant flow rate. After the end of both feed streams, a small sample was taken from the vessel to measure the distribution of molecular weights of the produced polymer, and the polymerization mixture was then left to react at 95° C. for 10 minutes more. After that, it was admixed with 22.1 g of a 25% strength by weight aqueous ammonia solution. The mixture was then left to react at 95° C. for other 10 minutes more. Subsequently, 24.5 g of a 7% strength by weight aqueous solution of sodium peroxodisulfate were metered in parallel with feed stream 2 over the course of 90 minutes at a constant flow rate. After the end of both feed streams, the polymerization mixture was then left to react at 95° C. for further 60 minutes. Thereafter, the aqueous polymer dispersion obtained was cooled to room temperature and filtered through a 260 μm filter.

Feed Stream 1 (Homogeneous Mixture of):
130.2 g of deionized water
7.0 g of a 15% strength by weight aqueous solution of sodium lauryl sulfate
15.1 g of 2,3-dibromopropene 80% strength by weight 139.5 g of butyl methacrylate
18.6 g of styrene
27.9 g of methacrylic acid
Feed Stream 2 (Homogeneous Mixture of):
229.4 g of deionized water
9.5 g of a 15% strength by weight aqueous solution of sodium lauryl sulfate
434.0 g of butyl methacrylate The aqueous polymer dispersion obtained had a solids content of 39.9% by weight. The number-average molecular weight of the polymer taken at the end of feed stream 1 was 2900 Da, and the weight-average molecular weight was 4200 Da, with a maximum peak at 6100 Da. The number-average molecular weight of the final polymer dispersion was 6400 Da, and the weight-average molecular weight was 20500 Da, with a maximum peak at 17400 Da.

Example 8 (E8)

The preparation of example 8 was the same as for the preparation of example 7 with the difference that in feed stream 1, 11.3 g of 2,3-dibromopropene 80% strength by weight were used instead of 15.1 g. In feed stream 2, 86.8 g of butyl acrylate and 347.2 g of butyl methacrylate were used instead of 434.0 g of butyl methacrylate.

The aqueous polymer dispersion obtained had a solids content of 39.9% by weight. The number-average molecular weight of the polymer taken at the end of feed stream 1 was 3900 Da, and the weight-average molecular weight was 8600 Da, with a maximum peak at 8300 Da. The number-average molecular weight of the final polymer dispersion was 12900 Da, and the weight-average molecular weight was 88600 Da, with a maximum peak at 29500 Da.

Comparative Example 1 (C1)

A polymerization vessel equipped with metering devices and temperature regulation was charged at 20 to 25° C. (room temperature) with 718.2 g of deionized water, and this initial charge was heated to 60° C. When that temperature had been reached, 180.2 g of a styrene acrylic polymer obtained as "Joncryl® 680" from BASF SE were added under stirring. Subsequently, 55.4 g of a 25% strength by weight aqueous ammonia solution were added, and the mixture was kept under stirring at 60° C. for 4 hours. After that, the vessel was heated to 80° C. under moderate nitrogen stream.

When that temperature had been reached, 54.2 g of a 4.7% strength by weight aqueous solution of sodium peroxodisulfate were added, and the batch was stirred for five minutes. Subsequently, with the temperature maintained, 126.4 g of a 4.7% strength by weight aqueous solution of sodium peroxodisulfate were metered over the course of 150 minutes at a constant flow rate in parallel with 420.0 g of butyl methacrylate over the course of 120 minutes at a constant flow rate. After the end of the feed stream of sodium peroxodisulfate, the polymerization mixture was then left to react at 80° C. for further 120 minutes. Thereafter, the aqueous polymer dispersion obtained was cooled to room temperature and filtered through a 260 μm filter.

The aqueous polymer dispersion obtained had a solids content of 40.0% by weight. The number-average molecular weight of the final polymer dispersion was 5200 Da, and the weight-average molecular weight was 75400 Da, resulting from a bimodal distribution of molecular weights with maximum peaks at 5000 Da and 99400 Da.

Comparative Example 2 (C2)

A polymerization vessel equipped with metering devices and temperature regulation was charged at 20 to 25° C. (room temperature) with 510.0 g of deionized water and 8.0 g of a 15% strength by weight aqueous solution of sodium lauryl sulfate, and this initial charge was heated to 80° C. under moderate nitrogen stream with stirring. When that temperature had been reached, 42.8 g of a 7% strength by weight aqueous solution of sodium peroxodisulfate were added, and the batch was stirred for five minutes. Subsequently, with the temperature maintained, feed stream 1 was metered over the course of 40 minutes at a constant flow rate. After the end of feed stream 1, the polymerization mixture was then left to react at 80° C. for 10 minutes more. After that, it was admixed with 21.1 g of a 25% strength by weight aqueous ammonia solution. The mixture was then left to react at 80° C. for other 10 minutes more. Subsequently, feed stream 2 was metered over the course of 90 minutes at a constant flow rate. After the end of feed stream 2, the polymerization mixture was then left to react at 80° C. for further 120 minutes. Thereafter, the aqueous polymer dispersion obtained was cooled to room temperature and filtered through a 260 μm filter.

Feed Stream 1 (Homogeneous Mixture of):
120.0 g of deionized water
6.8 g of a 15% strength by weight aqueous solution of sodium lauryl sulfate
6.6 g of 2-ethylhexyl thioglycolate
135.0 g of methyl methacrylate
18.0 g of styrene
27.0 g of methacrylic acid
Feed Stream 2 (Homogeneous Mixture of):
222.0 g of deionized water
9.2 g of a 15% strength by weight aqueous solution of sodium lauryl sulfate
420.0 g of butyl methacrylate The aqueous polymer dispersion obtained had a solids content of 40.0% by weight. The number-average molecular weight of the final polymer dispersion was 9200 Da, and the weight-average molecular weight of the same polymer was 154000 Da, resulting from a bimodal distribution of molecular weights with maximum peaks at 11500 Da and 84000 Da.

Comparative Example 3 (C3)

The preparation of comparative example 3 was the same as for the preparation of comparative example 1 with the difference that 420.0 g of butyl methacrylate were replaced by a mixture of 210 g of butyl acrylate and 210 g of methyl methacrylate and that a copolymer of styrene, alpha-methyl styrene and acrylic acid with a weight average molecular weight of approx. 8500 Da and an acid value of approx. 210 mg KOH/g resin were used.

Comparative Example 4 (C4)

The preparation of comparative example 4 was the same as for the preparation of comparative example 2 with the difference that 420.0 g of butyl methacrylate were replaced by a mixture of 210 g of butyl acrylate and 210 g of methyl methacrylate.

2. Preparations of Formulations
The following formulations were prepared:
320.7 wt.-‰ binder (as dry polymer),
18.0 wt.-‰ cosolvent, e.g. butyldiglycol
6.0 wt.-‰ cosolvent, e.g. the product Texanol 2.0 wt.-‰ surfactant, e.g. the product Byk 346 (solids content of 52 wt.-%)
4.0 wt.-‰ defoamer, e.g. Tego Foamex 810 (solids content of 100 wt.-%)
3.5 wt.-‰ defoamer, e.g. Tegy Airex 902W (solids content of 22-26 wt.-%)
5.0 wt.-‰ UV stabilizer, e.g. the product Tinuvin 1130 (solids content of 100 wt.-%)
12.5 wt.-‰ matting agent, e.g. the product Acematt TA 100 (solids content of 100 wt.-%)
12.5 wt.-‰ matting agent, e.g. the product Deuteron MK (solids content of 100 wt.-%)
1.5 wt.-‰ ammonia (25 wt.-% in water)
5.8-28.0 wt.-‰ rheology modifier, e.g. the product Rheovis PU 1190 (solids content of 34 wt.-%). Used in formulations F1 to F4 only.
5.0-18.5 wt.-‰ rheology modifier, e.g. the product Rheovis PE 1330 (solids content of 30 weight percent). Used in formulations F5 and F6 only.

The following components have been used as a binder-component:

F1: Example 2 of WO 2016/042116
F2: idem F1, but with 18.2 g methyl methacrylate instead of a 25 wt.-% solution of ureido methacrylate in methyl methacrylate in feed 2 and without the final addition of the aqueous solution of adipic acid dihydrazide
F3: Comparative example C4
F4: Comparative example C3
F5: Example E6
F6: Example E8

4. Results

When a determination is made of the material dissolved in basic environment (immersion of the films in aqueous ammonia 0.1 mol/l over 7 days and determination of the change in weight) of the free films obtainable by pouring the dispersion into a rubber mold and drying it to constant weight at 60° C., it was found that the weight loss, for example E1, is well below that of comparative examples C1 and C2 (for E1 less than 1% based on the weight of the dry film; for C1 and C2 greater than 15%, based on the weight of the dry film).

4 Results of the Leaching Tests

The leaching tests as described under section 1.5 gave the following results:

| | F1 | F2 | F3 | F4 | F5 | F6 |
|---|---|---|---|---|---|---|
| Leaching in water | 1.2% | 1.3% | 2.8% | 4.1% | 0.5% | 1.8% |
| Leaching in ammonia (0.1 mol/l solution in water) | 5.6% | 31.5% | 22.7% | 31.4% | 6.6% | 7.7% |

The project leading to this application has received funding from the European Union's Horizon 2020 research and innovation program under grant agreement No. 642514.

The invention claimed is:

1. A process for producing an aqueous polymer dispersion of polymerized ethylenically unsaturated monomers M, where the monomers M comprise
   a) at least one monomer M0 which is selected from compounds of formula 1,

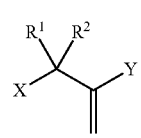

(1)

wherein X is Cl, Br or $OS(O)_2R^3$,
Y is H, C1-C10-alkyl, Cl, Br, $OS(O)_2R^4$, or $C(=O)OR^5$,
$R^1$ is H or $C_1$-$C_{10}$-alkyl,
$R^2$ is H or $C_1$-$C_{10}$-alkyl,
$R^3$ is $C_1$-$C_{10}$-alkyl,
$R^4$ is $C_1$-$C_{10}$-alkyl, and
$R^5$ is $C_1$-$C_{20}$-alkyl;
   b) at least one monomer M1 which is selected from nonionic monoethylenically unsaturated monomers having a solubility in deionized water of at most 60 g/L at 25° C. and 1 bar, and being different from monomers M0,
   c) at least one monomer M2 which is selected from ethylenically unsaturated monomers having a carboxylic acid group,
   d) optionally one or more ethylenically unsaturated monomers M3 that are different from monomers M0, M1, and M2,
where the process comprises
   i) a first polymerization step of an aqueous radical emulsion polymerization of a first monomer composition M.a to prepare a polymer, wherein the first monomer composition M.a comprises: at least 0.1% by weight, based on the total weight of the monomer composition M.a, of at least one monomer M0, and at least 1% by weight, based on the total weight of the monomer composition M.a, of at least one monomer M2,
   ii) neutralizing at least 50% of the carboxylic acid groups derived from monomers M2 of the polymer of step i) by addition of a base, and subsequently
   iii) at least one further polymerization step of an aqueous radical emulsion polymerization of a second monomer composition M.b in the presence of the polymer of step ii), where the monomers M comprise
      a. 5 to 95 wt %, based on the total amount of the monomers M, of the monomer compositions M.a., and
      b. 5 to 95 wt. %, based on the total amount of the monomers M, of the monomer composition M.b.

2. The process according to claim 1, where the monomers M0 are selected from compounds of formula 1a,

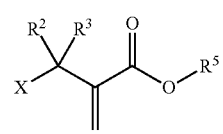

(1a)

wherein X, $R^1$, $R^2$ and $R^5$ are as defined for formula 1.

3. The process according to claim 2, where
$R^1$ is H,
$R^2$ is H or methyl,
$R^5$ is $C_1$-$C_{10}$-alkyl,
X is Cl, Br.

4. The process according to claim 1, where the monomer composition M.a comprises
a) 0.1 to 10% by weight, based on the total weight of monomer composition M.a, of at least one monomer M0,
b) 70 to 98.9% by weight, based on the total weight of monomer composition M.a, of at least one monomer M1,
c) 1 to 20% by weight, based on the total weight of the monomer composition M.a, of at least one monomer M2,
d) 0 to 20% by weight, based on the total weight of the monomer composition M.a, of at least one monomer M3.

5. The process according to claim 1, where the monomer composition M.a comprises
0.5 to 9% by weight based on the total weight of the monomer composition M.a, of at least one monomer M0, and/or
3 to 19% by weight based on the total weight of the monomer composition M.a, of at least one monomer M2.

6. The process according to claim 1, where the monomer composition M.b comprises
a) 90 to 100% by weight, based on the total weight of the monomer composition M.b, of at least one monomer M1,
b) 0 to 2% by weight, based on the total weight of the monomer composition M.b, of at least one monomer M2,
c) 0 to 10% by weight, based on the total weight of the monomer composition M.b, of at least one monomer M3.

7. The process according to claim 1, where the monomer composition M.b consists of one or more monomers M1 or of a mixture of monomers M1 and M3.

8. The process according to claim 1, where the monomers M1 are selected from the group consisting of C1-C20-alkyl esters of acrylic acid, C20-cycloalkyl esters of acrylic acid, C1-C20-alkylesters of methacrylic acid, $C_5$-$C_{20}$-cycloalkyl esters of methacrylic acid, and monovinyl aromatic monomers, and mixtures thereof.

9. The process according to claim 1, where the monomers M2 are selected from the group consisting of monoethylenically unsaturated monocarboxylic acids having 3 to 6 carbon atoms, monoethylenically unsaturated dicarboxylic acids having 4 to 6 carbon atoms, and mixtures thereof.

10. The process according to claim 1, wherein the monomers M3 are selected from the group consisting of
primary amides of monoethylenically unsaturated monocarboxylic acids having 3 to 6 carbon atoms (monomers M3.1),
N—$C_1$-$C_{10}$ alkyl amides of monoethylenically unsaturated monocarboxylic acids having 3 to 6 carbon atoms (monomers M3.2),
monoethylenically unsaturated monomers bearing a urea and/or a keto group (monomers M3.3),
hydroxyalkyl esters of monoethylenically unsaturated monocarboxylic acids having 3 to 6 carbon atoms (monomers M3.4),
monoethylenically unsaturated monomers which bear at least one mono-, di- and/or tri-$C_1$-$C_4$-alkoxysilane group (monomers M3.5),
multiethylenically unsaturated monomers (monomers M3.6),
monoethylenically unsaturated monomers having at least one acidic group and/or a salt thereof (monomers M3.7), with the proviso that they are different from monomers M2,
monoethylenically unsaturated monomers bearing at least one epoxy group,
and mixtures thereof.

11. The process according to claim 1, where the base that is used in step ii) is a volatile base.

12. The process according to claim 11, where the base that is selected from
ammonia,
primary, secondary, and tertiary amines,
and mixtures thereof.

13. The process according to claim 1, where in step ii), the base is added in such an amount that a pH in the range of 5 to 10 results.

14. The process according to claim 1, where an emulsifier E is present at the first polymerization step and/or at the second polymerization step.

15. The process according to claim 1, where the weight average molecular weight Mw of the polymer obtained from the polymerization of step i) is in the range of 1000 to 50000 g/mol.

16. The process according to claim 1, where the first polymerization step i) is performed in the presence of a chain transfer agent, which does not have any ethylenically unsaturated double bonds.

17. An aqueous polymer dispersion obtained by the process according to claim 1.

18. The aqueous polymer dispersion according to claim 17, where the polymer particles contained in the aqueous polymer dispersion have a polymer phase A formed by the monomer composition M.a and a polymer phase B formed by the monomer composition M.b, where the polymer phase A has a glass transition temperature Tg(A), and the polymer phase B has a glass transition temperature Tg(B), where the difference Tg(A)-Tg(B) is at least 10 K, where Tg(A) and Tg(B) are theoretical glass transition temperatures as determined by the Fox equation.

19. The aqueous polymer dispersion according to claim 18,
wherein the glass transition temperature Tg(A) is in the range of 0 to 150° C. and/or
wherein the glass transition temperature Tg(B) is in the range of −50 to 120° C.

20. The aqueous polymer dispersion according to claim 18, wherein the particle size distribution of these polymer particles has a maximum in the range of 20 to 300 nm.

21. The aqueous polymer dispersion according to claim 17, wherein the aqueous polymer dispersion has a solids content of 35 to 55%.

22. A water-borne coating composition containing the aqueous polymer dispersion according to claim 17,
which further contains at least a pigment and/or
which further contains at least a filler.

23. A method of producing a coating on a surface comprising
(a) applying the water-borne coating composition according to claim 22 to the surface, and
(b) allowing the composition to dry to produce the coating.

* * * * *